United States Patent [19]

Pirz et al.

[11] 4,349,700
[45] Sep. 14, 1982

[54] CONTINUOUS SPEECH RECOGNITION SYSTEM

[75] Inventors: Frank C. Pirz, Madison; Lawrence R. Rabiner, Berkeley Heights, both of N.J.

[73] Assignee: Bell Telephone Laboratories, Incorporated, Murray Hill, N.J.

[21] Appl. No.: 138,647

[22] Filed: Apr. 8, 1980

[51] Int. Cl.³ .............................................. G10L 1/00
[52] U.S. Cl. ............................................... 179/1 SD
[58] Field of Search ........................ 179/1 SD, 1 SB; 364/728; 340/146.3 WD, 146.3 AQ, 146.3 SG

[56] References Cited

U.S. PATENT DOCUMENTS

| | | | |
|---|---|---|---|
| 3,700,815 | 10/1972 | Doddington et al. | 179/1 SB |
| 3,770,892 | 11/1973 | Clapper | 179/1 SB |
| 3,816,722 | 6/1974 | Sakoe et al. | 364/728 |
| 4,049,913 | 9/1977 | Sakoe et al. | 179/1 SD |
| 4,059,725 | 11/1977 | Sako et al. | 179/1 SD |
| 4,107,460 | 8/1978 | Grunza et al. | 179/1 SD |
| 4,156,868 | 5/1979 | Levinson | 340/146.3 WD |

Primary Examiner—Errol A. Krass
Assistant Examiner—E. S. Kemeny
Attorney, Agent, or Firm—Jack S. Cubert

[57] ABSTRACT

Recognition of continuous speech by comparison with prestored isolated words may be confused by the merging together of spoken adjacent words (coarticulation). Improved recognition is attained by generating overlap-words, e.g., words whose first phoneme is the end phoneme of the preceding word in a string of words. The reference candidate series of overlap-words is transformed under dynamic time warping so as to time-match the utterance series of overlap-words.

25 Claims, 14 Drawing Figures

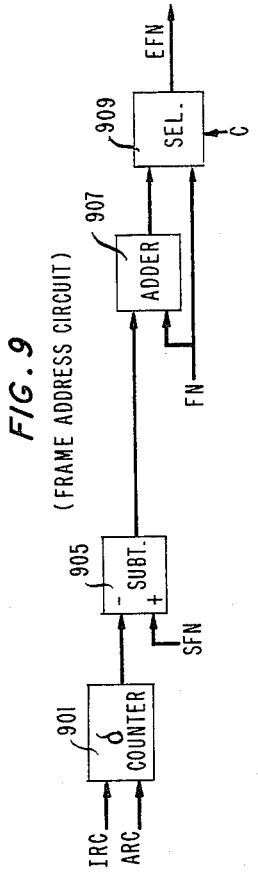
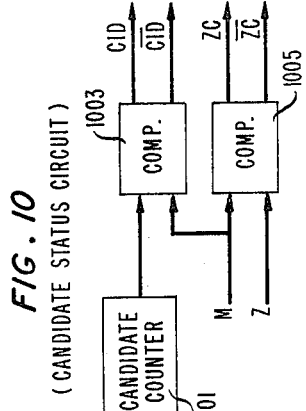
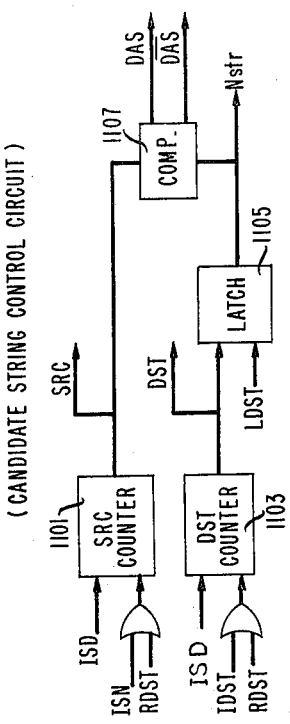
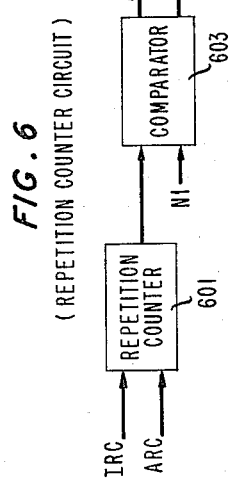
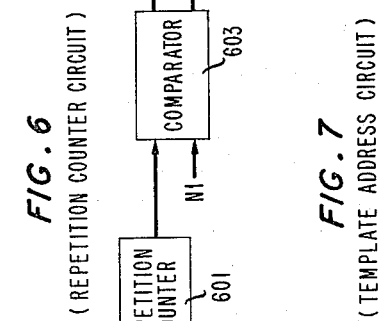
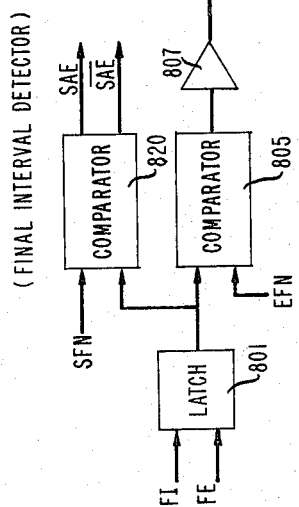

CONTINUOUS SPEECH RECOGNITION SYSTEM

BACKGROUND OF THE INVENTION

OUr invention relates to pattern recognition and more particularly to arrangements for automatically recognizing a continuous speech pattern as a series of words.

In communication, data processing, and control systems, it is often desirable to use speech as a direct input for inquiries, commands, data or other information. Speech recognition devices obviate the need for expensive manually operated terminal equipment and permit individuals to interact with automated equipment while simultaneously engaging in other activities. The variability of speech patterns from speaker to speaker and even for a particular speaker, however, has limited the accuracy of speech recognition. As a result, speech recognition arrangements have been successful only in specially designed environments.

Most speech recognition systems are adapted to receive input speech signals and to transform the speech signals into sets of prescribed acoustic features. The input speech acoustic features are compared to stored sets of previously obtained reference features for identified words. The speech signal is identified when the input speech features match the stored features of a particular reference word in accordance with predetermined criteria. The accuracy of such recognition systems is highly dependent on the selected features and on the prescribed recognition criteria. Best results are obtained when the reference features and the input speech features are derived from the same individual and the speech pattern to be recognized is spoken with distinct pauses between individual words.

Recognition of continuous speech patterns may be accomplished by comparing the sequence of input speech features with every possible combination of reference word feature signal patterns derived from continuous speech. Such arrangements however require time consuming testing on all possible reference word pattern combinations and an exhaustive search through the large number of reference word combinations. As is well known, the number of possible sequences increases exponentially with the number of words in the series. Consequently, it is generally impractical to perform the exhaustive search even for a limited number of words in a pattern. Semantic and syntactic rules may be devised to limit the number of possible sequences in a search so that certain classes of information can be readily analyzed. U.S. Pat. No. 4,156,868 issued to S. E. Levinson May 29, 1979 and assigned to the same assignee discloses a recognition arrangement based on syntactic analysis. But recognition of random sequences of unrelated words such as a series of numbers is not improved by resorting to such contextual constraints.

U.S. Pat. Nos. 4,049,913 and 4,059,725 disclose continuous speech recognition systems in which the similarity between the reference word feature patterns and all possible portions of the input speech pattern are calculated. Partial recognition results are derived from the similarity measures and both the partial similarity measures and the partial recognition results are stored in a table. All possible partial pattern series which form continuous patterns are selected from the table. The continuous pattern for which the similarity is maximum is then chosen. The recognized results from the table are extracted to provide the reference word series corresponding to the input speech pattern. These systems have been effective in continuous speech recognition. The signal processing to obtain reference patterns and partial pattern similarity measures, however, is exceedingly complex and uneconomical for many applications.

Alternative arrangements have been proposed in which an input speech pattern is segmented and each segment is recognized as one of a set of reference words. These alternatives require much less signal processing but do not take into account the high degree of coarticulation in continuous speech which makes accurate segmentation difficult. The coarticulation or merging together of adjacent words in a continuous speech pattern makes recognition unreliable and also makes selection of reference word training patterns difficult. It is an object of the invention to provide improved continuous speech recognition utilizing economical signal processing arrangements and simplified reference word training patterns.

BRIEF SUMMARY OF THE INVENTION

The invention is directed to a continuous speech recognizer adapted to identify an unknown utterance as a series of reference words. Signals representative of the acoustic features of a set of reference words are stored and a sequence of signals representative of the acoustic features of the utterance are produced. At least one reference word series is generated as a candidate for the utterance responsive to the reference word and utterance feature signals and the utterance is identified as one of the candidate series. The candidate series generation includes producing a signal which identifies successive word position intervals for the utterance and forming at least one reference word series partial candidate in each word position interval. In each word position interval, an utterance segment is determined for each reference word which segment begins within a predetermined range of the utterance portion endpoint of the reference word series partial candidate of the preceding word position and which corresponds to the reference word feature signals. A signal representative of the similarity between each reference word and the corresponding determined utterance interval is formed. Each reference word having a prescribed similarity to its corresponding utterance segment is combined with the reference word series partial candidate of the preceding word position to form a partial candidate series for said word position interval.

According to one aspect of the invention, coarticulation in the utterance is accounted for by generating a precessing sequence of utterance segment beginning points for each reference word of the current word position. The precessing beginning points overlap the preceding word position word series partial candidate utterance segment endpoint. The precessed utterance segment having acoustic features which best correspond to the reference word acoustic features is selected as the utterance segment for the reference word in the current word position.

According to another aspect of the invention, the reference word series partial candidates for a word position are selected by identifying the word position reference word with the best correspondence to its utterance segment and each word position reference word having a correspondence to its utterance segment within a predetermined range of the best correspondence. The selected word position reference words are combined with the partial candidate of the preceding word position to form reference word series candidates for the current word position. In this way, the most probable reference word series partial candidates are selected.

BRIEF DESCRIPTION OF THE DRAWINGS

FIG. 6 depicts an arrangement which may be used as the repetition counter circuit of FIG. 3;

FIG. 7 depicts an arrangement which may be used as the template address circuit of FIG. 3;

FIG. 8 depicts an arrangement which may be used as the final interval detector of FIG. 3;

FIG. 9 depicts an arrangement which may be used as the frame address circuit of FIG. 3;

FIG. 10 depicts an arrangement which may be used as the candidate status circuit of FIG. 3;

FIG. 11 depicts an arrangement which may be used as the candidate string control circuit of FIG. 3.

GENERAL DESCRIPTION

Figures 1, 2:
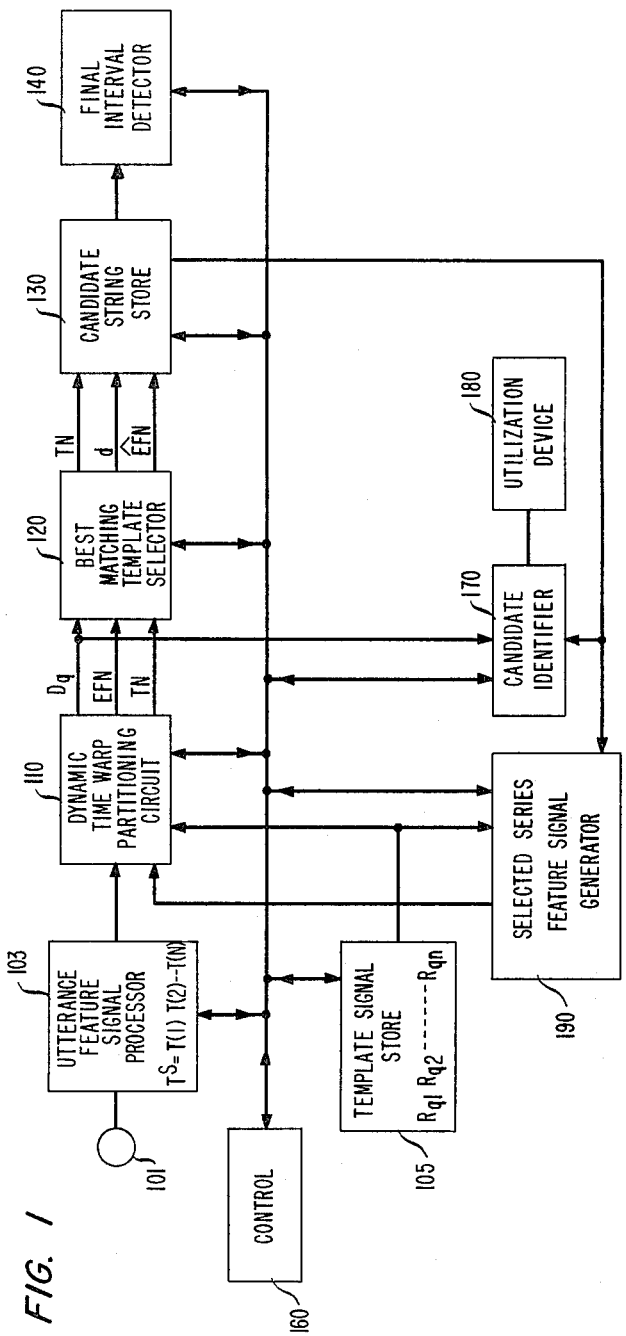
FIG. 1 depicts a general block diagram of a continuous speech recognizer illustrative of the invention.
FIG. 2 shows waveforms illustrating the utterance segmenting arrangement of the invention.

FIG. 1 shows a general block diagram of a speech recognizer illustrative of the invention. Template store 105 in FIG. 1 stores a set of template signals representative of acoustic features of the reference words to which the utterance is compared. The acoustic feature signals are derived from isolated utterances of the reference words by means of a linear prediction analysis well known in the art. Although linear prediction parameters are used as features signals in the arrangement of FIG. 1, it is to be understood that other features such as spectral or formant parameters may also be used. The utterance of each reference word q is divided into i frames and a $p^{th}$ order feature vector $R_q(i)$ signal is produced for each frame. The feature vector signal corresponds to the autocorrelated linear prediction coefficients of the frame speech signal. The reference word utterance is then represented by the signal:

$$R_q = R_q(1) \, R_q(2) \ldots R_q(M_q) \tag{1}$$

where $R_q(i)$ is the feature vector of the $i^{th}$ frame of the $q^{th}$ reference word, and $M_q$ is the total length in frames of the reference word utterance. The template signals $R_q$ for the reference words $q_1, q_2 \ldots q_v$ are stored in template store 105 and are addressed by template word number signal TN.

Utterance feature signal processor 103 is conditioned to receive a speech signal from microphone 101 and to convert the speech signal into a sequence of acoustic feature signals of the same type stored in template store 105. A linear prediction coding analysis is performed on each frame j of the speech signal to form feature vector signal $T^s(j)$. The utterance feature signal is then:

$$T^s = T^s(1) \, T^s(2) \ldots T^s(j) \ldots T^s(N) \tag{2}$$

where N is the number of frames of $T^s$.

Assume for purposes of illustration that the speech signal is a digit string and that the reference words $q_0$, $q_1, q_2, \ldots, q_g$ consist of the set of digits 0 through 9. The arrangement of FIG. 1 is adapted to select the concatenation of reference digits that is most similar to the speech signal. The K word concatenated reference digit string is:

$$R^s = R_{q(1)} \oplus R_{q(2)} \oplus \ldots \oplus R_{q(k)} \oplus \ldots \oplus R_{q(K)} \tag{3}$$

$$R^s = R_{q(1)}(1) R_{q(1)}(2) \ldots R_{q(K)}(M_q(K)) \tag{4a}$$

$$R^k = R^s(1) R^s(2) \ldots R^s(P) \tag{4b}$$

where k denotes the word position in the series, K corresponds to the last word position and $\oplus$ signifies concatenation, and P is the total number of reference frames for $R^K$ is:

$$P = \sum_{k=1}^{K} M_{q(k)} \tag{5}$$

As disclosed in the article "Minimum Predictive Residual Principle Applied to Speech Recognition" by F. Itakura appearing in the *IEEE Transactions on Acoustics, Speech, and Signal Processing*, Vol. ASSP-23, pp 67–72, February 1975, one well known measure of the similarity between acoustic patterns is based on the frame distance d between reference word feature vector frames i and the unknown utterance feature vector frames j in accordance with Equation 6.

$$d(i,j) = \hat{d}(R^s(i), T^s(j)) = \log(R^s(i) \cdot T^s(j)) \tag{6}$$

$T^s(j)$ and $R^s(i)$ are $(p+1)^{th}$ order feature vectors and $R^s(i) \cdot T^s(j)$ is a ratio of prediction residuals as defined in the "Minimum Prediction Residual Applied to Speech Recognition", *IEEE Transactions on Acoustics, Speech, and Signal Processing*, Vol. ASSP-23, pp 67–72, February 1975 article. The concatenated series of reference words $R^s$ that best matches the utterance feature vectors $T^s$ is the series that has the minimum distance:

$$D(R^s, T^s) = D(R_{q(1)} \oplus R_{q(2)} \oplus \cdots \oplus R_{q(K)}, T^s) \tag{7}$$

over all possible K and q(K). If T is partitioned into K intervals, Equation 7 may be expressed as:

$$D(R^s, T^s) = \sum_{k=1}^{K} \sum_{i=1}^{M_{q(k)}} d(R_{q(k)}(i), T^s(w(i))) \tag{8}$$

w(i) is a distance minimizing warping function between reference frame $R_{q(k)}(i)$ and utterance frame $T^s(w(i))$ as obtained from the dynamic time warp disclosed in the article "Considerations in Dynamic Time Warping Algorithms for Discrete Word Recognition" by L. R. Rabiner, S. E. Levinson and A. E. Rosenberg, *IEEE Transactions ASSP*, Vol. ASSP-26, No. 6, pp 575–582, December 1978. The number of possible digit strings for even moderate values of K is large, e.g., 1000 strings for K=3 and each digit string requires at least one full dynamic time warp. The signal processing required to minimize $D(R^s, T^s)$ is very large and uneconomical for many applications.

We have found that the signal processing required for accurate continuous speech recognition can be substantially reduced. This is accomplished by successively partitioning the utterance into reference digit corresponding word position segments which segments are overlapped to account for merging of adjacent digits due to coarticulation. In the first partitioning (k=1), a set of segments for the first word position are determined. Each segment corresponds to one of the reference digits. A signal representative of the distance between the utterance segment feature vectors and the corresponding reference digit feature vectors is also generated. Reference digits whose features have a prescribed degree of similarity to the corresponding utterance segment features are selected and stored along with the endpoints of their utterance segments.

In each successive partitioning, the utterance segment determined for each reference word begins in a region around the previously selected digit segment endpoint and partial candidate digit sequences are selected which have a prescribed similarity to the utterance from its beginning to the current selected reference digit segment endpoint. When all selected partial candidate reference word series endpoints are within a predetermined range of the utterance endpoint, the utterance is identified as the selected reference digit sequence having the minimum feature vector distance to the utterance.

FIG. 2 illustrates the overlapping segmenting arrangement. An unknown utterance of N frames is represented in line 203 and a concatenated reference digit string is represented in line 201. Bracketed region 210 is a reference digit interval on line 201 for digit $q(1)$ from its beginning point $a_o$ to its endpoint at frame $a_1$. The utterance interval corresponding to reference digit $q(1)$ is determined by a dynamic time warp of feature signals to be bracketed region 211 from $b_0$ to $b_1$. Similarly, utterance intervals on line 201 are determined for the other digit positions $q(2)$, $q(3)$, $q(4)$ and $q(5)$. If digit $q(1)$ is selected as having a prescribed similarity to the utterance portion between $b_0$ and $b_1$, frame $b_1$ is used as a beginning point for selection of the next digit of a sequence $q(2)$. Bracketed region 212 is a reference digit interval $a_1$-$a_2$ for digit $q(2)$ on concatenated reference string line 201. This region is transformed by dynamic time warping into region $b'_1$-$b_2$ on line 203.

Regions $b_0$-$b_1$ and $b'_1$-$b_2$ overlap to account for coarticulation between adjacent digits $q(1)$ and $q(2)$ and other effects of using isolated reference word templates. For example, if the sequence three eight is spoken, there is generally a merger between the ending of the three and the beginning of the eight. The overlapping of regions $b_0$-$b_1$ and $b'_1$-$b_2$ permits a realistic measure of the similarity between the utterance interval feature signals and the isolated reference word templates to be made. As described in the article "Coarticulation in VCV Utterances: Spectrographic Measurements" by S. E. G. Ohman, *Journal of the Acoustical Society of American*, Vol. 39, pages 151-168, 1965, the coarticulation by different combinations of words results in overlap regions in the range of 50 to 80 milliseconds. By taking into account the overlap regions, digit coarticulation effects as well as differences between isolated versions of a spoken word and the word when used in a connected format are avoided. Similarly, the successively partitioned overlapping regions $b_1'b_2, b_2'$-$b_3, b_3'$-$b_4$ and $b'_4$-$b_5$ of line 203 corresponding to concatenated isolated reference word regions $a_1$-$a_2, a_2$-$a_3, a_3$-$a_4$ and $a_4$-$a_5$.

The first word position partitioning of the input utterance is started after the generated utterance feature signals are stored in processor 103. Partitioning circuit 110 receives the template feature signals for the zero digit $q(1)=0$ from the template store and utterance feature signals $T(1), T(2), T(3)$ ... from the utterance store. A set of dynamic time warps are performed to determine the utterance interval from $T(1)$ which best matches template $R_0(1)$, and to generate a distance signal corresponding to the similarity of the utterance interval feature signals and the reference template signals $R_{q(1)}$ where $q(1)$ are the reference digits 0–9. The distance signal:

$$D(R_{q(k)}, T^s(n)) = \frac{1}{M_{q(k)}} \sum_{i=1}^{M_{q(k)}} d(R_{q(k)}, T^s(w(i))), \qquad (9)$$

is first produced for the $g(1)=0$ digit. The utterance feature signals are supplied over the segment which starts at the utterance beginning point $n=n_1$ and ends at an endframe EFN corresponding to $w(M_0)$ in equation 9. The dynamic time warp is repeated for several precessed beginning points from $n=n_1$, i.e., $n=n_1-d$, $n_1-2\delta$, ..., $n_1-N\delta$ in accordance with the overlap arrangement of the invention. The distance and segment endframe signals for the N time warps are placed in selector 120. The minimum distance signal $D'_{0(1)}$ and the corresponding ending frame for $q_0(1)$ are stored as the best matching results for digit $q_0(1)$. In similar manner, distance and ending frame signals are generated for the first word position digits $q_1(1), q_2(1) \ldots q_g(1)$.

Selector 120 is then rendered operative to determine and store the minimum of the best matching distance signals $D'_{0(1)}, D'_{1(1)}, \ldots D'_{9(1)}$. If the selected minimum $D''_{q(1)}$ (the selected minimum of the best matched distance) is below a predetermined threshold, it is stored as a candidate digit for word position $k=1$. The best matching distance signals within a predetermined range of $D''_{q(1)}$ are also stored as candidate digits for the utterance first word position. If no best matching distance signal is below the predetermined threshold, the andidate is discarded. The candidate identification TN, the candidate distance signal $d_c(1)$, and the candidate utterance endframe signal $EFN_c(1)$ for each partial candidate string is stored in candidate string store 130. The candidate endframe signals $EFN_c(1)$ are then compared to the utterance termination frame in final interval detector 140.

Unless all $EFN_c(1)$ are within a predetermined range of the utterance termination frame $U_T$, a second word position segmentation is initiated. In the second and each succeeding word position, the first stored partial candidate endframe $EFN_c(1)$ is a reference word corresponding utterance segment beginning point. The distance signals for each template, e.g., $D_{0(k)}{}^{n1} D_{0(k)}{}^{n1-\delta}, \ldots D_{0(k)}{}^{n1-n\delta}$ and the corresponding interval endframe signals are generated. As in the first word position, the best matching distance signal of the set of overlapping dynamic time warps is stored. After the dynamic time warps are completed for the $q(k)=9$ reference digit, the candidate digits are selected for the $k^{th}$ digit position of the candidate string. The dynamic time warp processing is the repeated for the remaining partial candidate strings with the endframe of each candidate string as the beginning frame for the segmentation. At the end of each word position partitioning, there are generally only one to four candidate strings stored in string store 130. The dynamic time warp processing is limited to only the likely partial candidate strings taking into account coarticulation and isolated reference word templates. Consequently, the signal processing needed for selection of digit strings is substantially reduced.

When the endframes of all candidate strings $EFN_c(k)$ are in the region of the utterance endframe $U_T$, the word position processing is terminated. The candidate string identifications for the utterance in store 130 are then utilized to form a sequence of template feature signals $R^s = R_{q(1)} \oplus R_{q(2)} \oplus \ldots \oplus R_{q(K)}$ in string feature signal generator 190. A distance signal jointly responsive to the candidate string and the utterance feature signal is generated in partitioning circuit 110 in accordance with equation 8. The string accumulated distance signal from string store 130 is added to the concatenated reference string distance signal in candidate identifier 170. The resulting sum is stored in string store 130 and the minimum summed distance signal for all candidate strings is used to identify the string which most closely corresponds to the utterance. The utterance identification signal from identifier 170 is then applied to utilization device 180 which may be a suitable data processor.

DETAILED DESCRIPTION

Figure 3:
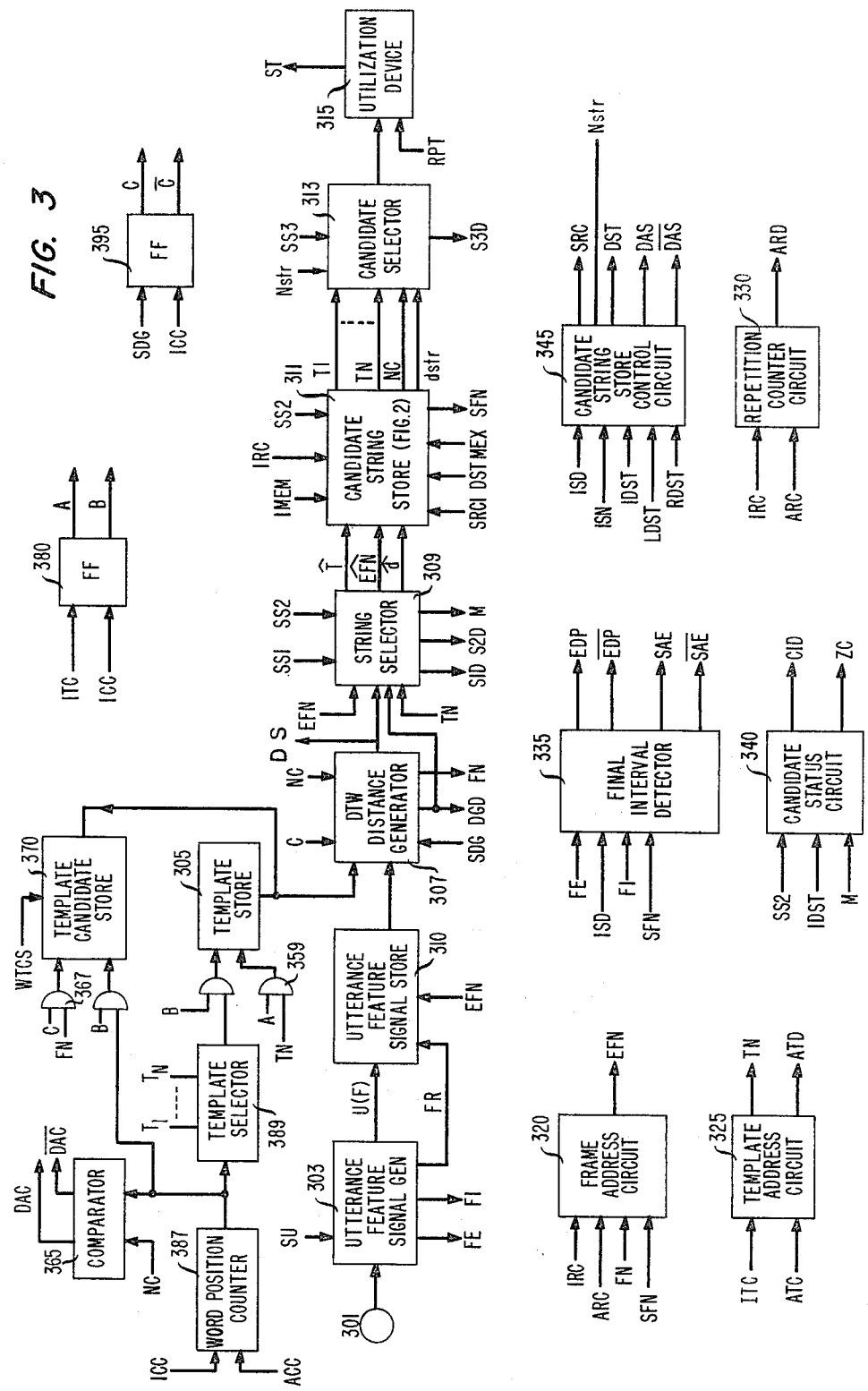
FIGS. 3 and 4 depict a detailed block diagram of the continuous speech recognizer of FIG. 1.
Figure 4:
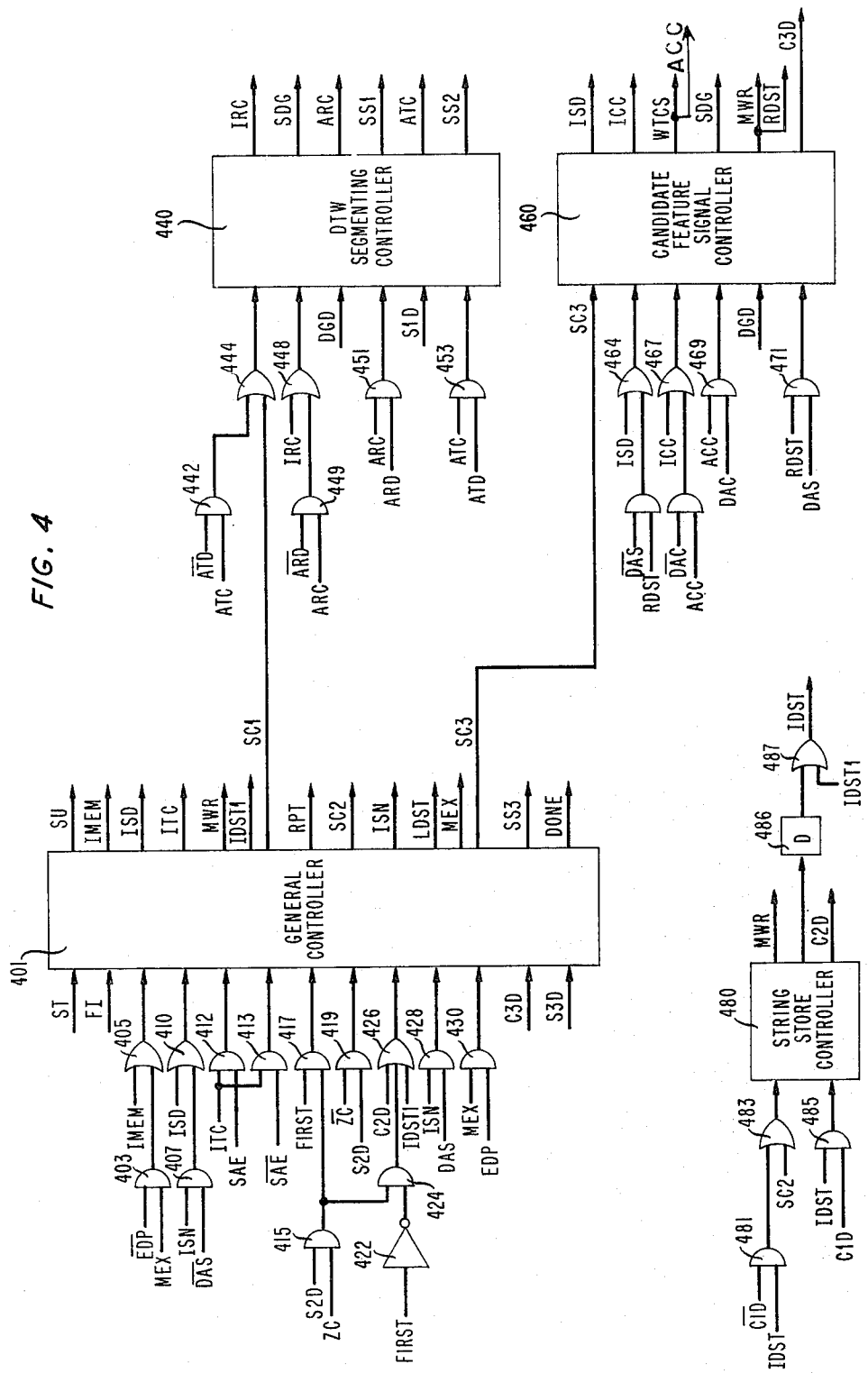

A detailed block diagram of a speech recognizer illustrative of the invention is depicted in FIGS. 3 and 4. Referring to FIG. 4, control signal ST is supplied to general controller 401 from utilization device 315 in FIG. 3 when a speech signal to be recognized is produced at microphone 301. Signal ST is shown in waveform 1201 in FIG. 12. Responsive to momentary signal ST, control signal SU (waveform 1203) is produced in controller 401. Signal SU is applied to utterance feature generator 303 between times $t_1$ and $t_2$. Utterance feature generator 103 may comprise a digital processor arrangement such as the micro NOVA MP/100 system processor, the MP/100 8 K programmable read only memory, the MP/100 4K/8K dynamic random access memory and a model 4222 digital I10 interface unit. The operation of generator 303 may be controlled by permanently stored instruction signals in accordance with the FORTRAN language program of Appendix A of "Formant Trajectory Estimation from a Linear-Least-Squares Inverse Filter Formulation" by John D. Markel, Speech Communications Research Laboratory, Inc., Monograph No. 7 October 1971. The generator is operative to produce a sequence of acoustic feature vector signals $T(1), T(2), \ldots T(n)$. A multidimensional feature vector signal $T(j)$ is generated for each speech sample frame j. Each sample frame j is of 10 millisecond duration.

Each of controllers 401, 440, 450, and 480 may comprise an array of logic circuits well known in the art which is adapted to provide a sequence of control pulses responsive to logic circuit input pulses. The channel selection apparatus described on page 48 of Vol. 13 of 400 Ideas For Design, by Hayden Book Company, Rochelle Park, New Jersey, copyright 1976 may be readily adapted for use as any of controllers 401, 440, 460 or 480 where momentary switches are replaced by input signals to the control. An input signal, e.g., FI, to control 401 applied to the channel selection apparatus from utterance feature generator 303, enables only output signal, e.g., TMEM and disables the previously active output signal. In this way, only one selected output of the control is enabled by the channel selector while any previously enabled output is disabled. Alternatively, a control of the type depicted in U.S. Pat. No. 4,156,868 issued May 29, 1979 may be utilized.

The generated feature signals are transferred to utterance feature signal store 310 under control of frame address signal FR. When the end of the utterance is detected in generator 303 at time $t_2$, signals FI and FE of waveforms 1205 and 1207 are produced. Signal FE corresponds to the endframe region of the utterance $U_T\text{-}\Delta_T$ and is supplied to final interval detector 335. Assume that the endframe FE is $U_t - \Delta_t = 100$. Signal FI is applied to controller 401 to indicate the termination of the feature signal generation.

Figure 12:
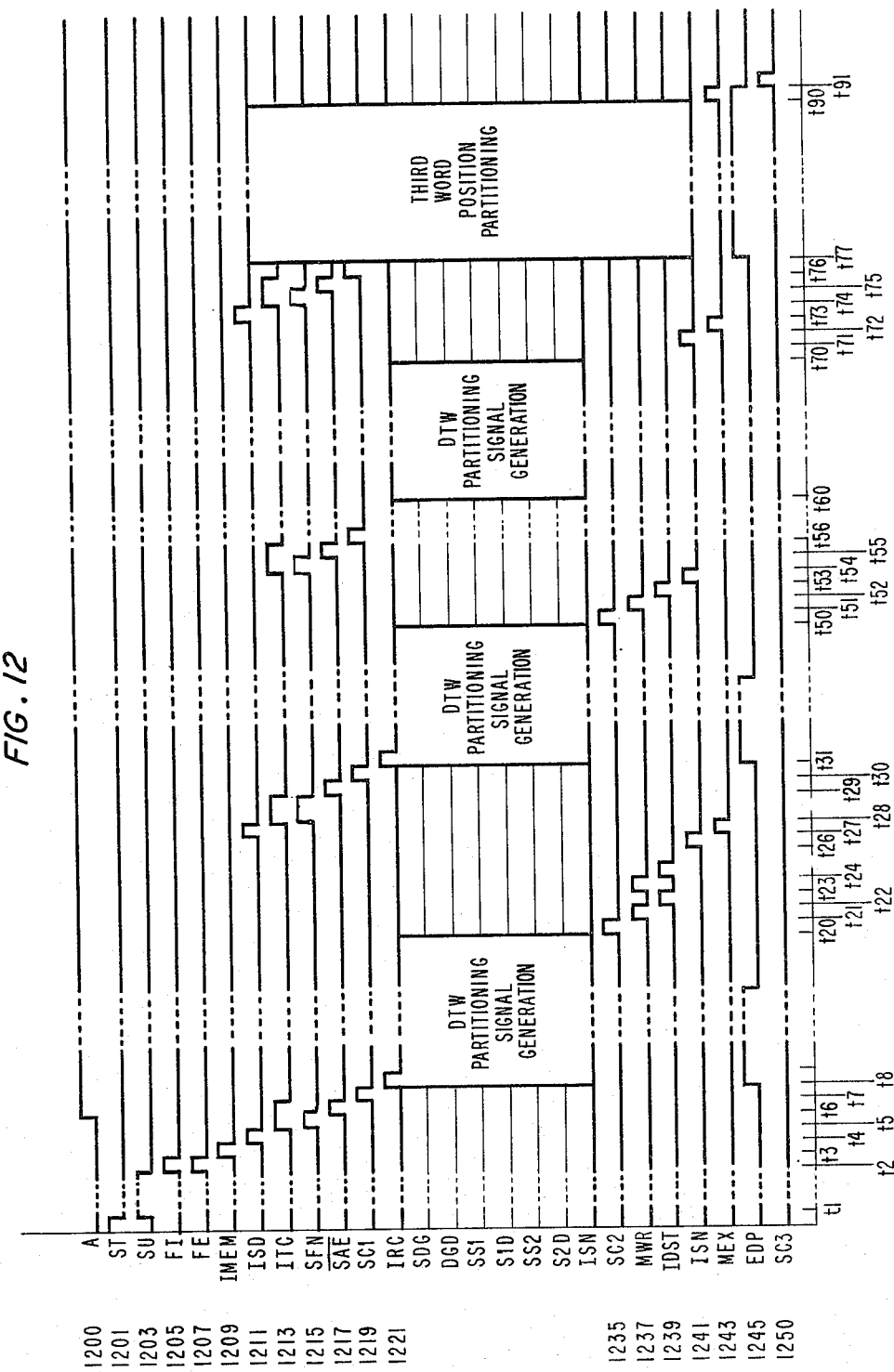
FIGS. 12, 13 and 14 show waveforms and flow diagrams illustrating the operation of the circuit of FIGS. 3 and 4.

Responsive to signal FI, controller 401 produces signal IMEM (waveform 1209) at time $t_3$ in FIG. 12. Signal IMEM clears candidate string store 311 so that new information may be entered therein. Signal IMEM is also supplied to controller 401 to generate signal ISD at time $t_4$ in FIG. 12. The LSD signal (waveform 1211) initially clears candidate string control circuit 345 and produces an ITC signal (waveform 1213) at time $t_5$ which is operative to clear template address circuit 325.

The FI and FE signals are supplied to final interval detector 335 shown in detail in FIG. 8. Referring to FIG. 8, the FE utterance end signal is placed in latch 801 responsive to the FI utterance feature generation ending signal. The output of latch 801 is applied to one input of comparator 820. The other input of comparator 820 receives a starting frame signal SFN (waveform 1215) from candidate string store 311. As aforementioned candidate string store 311 is reset to zero at this time. Thus an SFN=0 signal is compared to the frame ending region of the utterance. Since SFN=0 is substantially smaller than the utterance ending frame 100, the $\overline{SAE}$ signal from comparator 820 (waveform 1217) is enabled at time $t_6$ in FIG. 12. Gate 413 is then enabled responsive to the ITC and $\overline{SAE}$ signals whereby signal SCl (waveform 1219) is produced by controller 401 at time $t_7$. Signal ITC also sets flip-flop 380 to its set state and signal A (waveform 1200) is enabling.

Signal SC1 is supplied to DTW partitioning controller 440 which enables signal IRC responsive thereto. Signal IRC (waveform 1221) resets repetition counter circuit 330 to its initial state at time $t_8$.

The dynamic time warp positioning and candidate selection operations of generator 307 and selector 309 are started. The timing of these operations is generally indicated in FIG. 12 between times $t_8$ and $t_{20}$. The sequence of operations is illustrated in the flow diagram of FIG. 13. The IRC signal shown in box 1301 of FIG. 13 at time $t_8$ causes controller 440 to produce an SDG signal (Box 1305). The SDG signal is supplied to the dynamic time warp distance generator 307 in FIG. 3 to start the initial segmentation (box 1305). DTW generator 307 may comprise an arrangement such as described in the Microproducts Hardware Systems Reference published by Data General Corporation, Westboro, Mass. and copyrighted by Data General Corporation, 1979 or other microprocessor systems well known in the art. Generator 307 may include the micro Nova MP100 system processing unit, the MP1100 4K/8K dynamic random access memory, the MP/100 8K programmable read only memory, and one or more model 4222 digital I/O interface units. The operation sequence of generator 307 is determined by the permanently stored instructions in the read only memory thereof. These instructions are listed in FORTRAN language form in Appendix A. Similarly, string selector 309 may also comprise the Micro Nova MP100 system, MP/100 4K/8K memory, MP100 8K programmable memory and one or more model 4222 interface units. The permanent instructions controlling the string selector operation are listed in FORTRAN language in Appendix B.

The output of template address circuit 325 is then TN=TO. Flip-flop 380 provides a high A control signal. Jointly responsive to the TO and A signals, zero digit template from template store 305 is transferred into DTW distance generator 307. Generator 307 provides a sequence of template frame addressing codes FN corresponding to the successive reference feature vector signals to frame address circuit 320 which is shown in greater detail in FIG. 9. Frame address circuit 320 includes $\delta$ counter 901, subtractor 905, adder 907 and selector 909. $\delta$ counter 901 was initially reset to zero by signal IRC. The output coded signal of counter 901 is applied to the negative input of subtractor 905 in which the $\delta$ code is subtracted from the starting frame signal SFN. The resultant signal SFN-$\delta$ is applied to one input of adder 907 wherein the frame number codes of the template feature signals are added to the output of subtractor 905. The EFN signal from adder 907 is supplied to utterance feature signal store 310 via selector 909 as an utterance frame address signal for the feature vectors T(j).

At the beginning of the first partitioning $\delta$ counter 901 is set to zero. The starting frame number SFN of the interval is zero corresponding to the beginning of the utterance. Consequently, the output of adder 907 is identically the frame numbers from distance generator 307. In this manner, the initial utterance feature vector signals $T^s(0)$, $T^s(1)$ . . . are sequentially supplied to distance generator 307 as addressed by the reference template feature signal frames FN. For the first time warp processing, EFN begins at zero. The next time warp begins at frame $-\delta$ and the $N^{th}$ time warp begins at $-N\delta$. A prefix of zero feature vectors are inserted to utterance store for the first word position time warp processing.

In the first partitioning operation for template $R_{0(1)}$ the distance signal $D_{0(1)}^{n1}$ is produced in accordance with equation 9. When the end of the utterance interval corresponding to reference template feature vector $R_{0(1)}$ is reached, generator 307 produces a DGD signal (box 1307) which signal is supplied to controller 440. DTW partitioning controller 440 then supplies an advance repetition counter signal ARC (box 1309) which increments repetition counter circuit 330 shown in FIG. 6.

As indicated in FIG. 6, repetition counter 601 is initially reset to its zero state by signal IRC at time $t_8$ on FIG. 12. Responsive to the ARC signal from controller 440, the repetition count is advanced to its first state. The ARC signal is also supplied to frame address circuit 320 to advance the $\delta$ counter 901. In this manner, the starting frame number is precessed by $\delta$ frames responsive to each ARC signal whereby overlapping interval dynamic time warping is accomplished. Signal ARD (decision box 1313) from comparator 603 is enabled until repetition counter 601 reaches the last repetition position N1.

Figure 13:
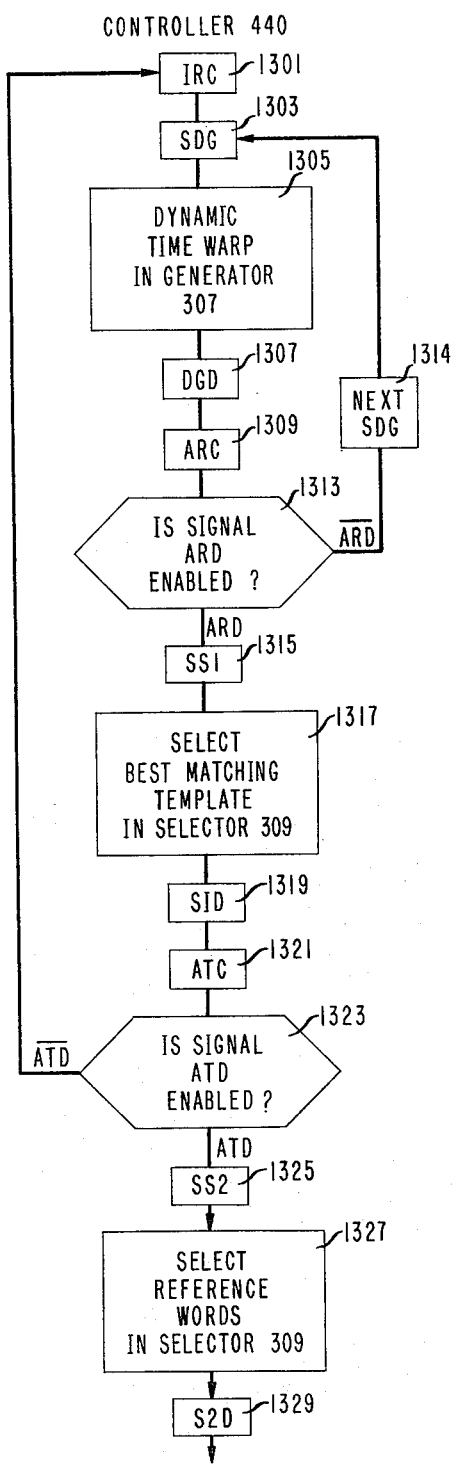

The ARC signal is supplied to AND-gate 449 which causes controller 440 to produce another SDG signal. In FIG. 13, this is shown as the path from box 1313 to box 1301 via next SDG box 1314. The second dynamic time warp partitioning for the first reference template is then started. In the second dynamic time warp, the first EFN frame number from adder 907 is SFN-$\delta$. Upon completion of the dynamic time warp in accordance with equation 9, partitioning generator 307 supplies a DGD signal to controller 440 which in turn generates an ARC pulse to increment repetition counter 601 and $\delta$ counter 901. In this manner the dynamic time warp partitioning is repeated for N different starting points. At each repetition, the first EFN frame is cut back by $\delta$ frames so that the succession of initial frames is SFN, SFN-$\delta$, SFN-2$\delta$, . . . , SFN-N$\delta$. In general, the overlap region described in the aforementioned Ohman article may be parititioned into $1 \leq \delta \leq 8$ parts where $\delta$ is a number of 10 ms frames. N, the total number of precessed beginning points is 80/10$\delta$. $\delta$=2 and N=4 provide a suitable dynamic time warp scheme although any alternative values which divide the overlap region and take into account the well recognized coarticulation overlap may also be used.

The output distance codes from the sequence of first reference template time warps and the ending frames of these time warps are transferred to and stored in string selector 309. At the beginning of the N$\delta$ repetition, counter 601 is incremented to its $N^{th}$ state and an ARD signal (decision box (1313)) is obtained from comparator 603. When the last repetition of the q(1)=0 time warp is completed, the DGD signal (box 1307) from generator 307 is applied through gate 451 to controller 440. In this manner, an SS1 selection signal (box 1315) is produced. The SS1 signal is applied to string selector 309 and is effective to initiate the selection of the best matching distance signal of those received from generator 307 for the q(1)=0 digit (box 1317). In the arrangement of selector 390, the minimum distance code for the q(1)=0 digit is determined and stored.

Signal S1D (box 1319) is produced by selector 309 after the storage of the minimum distance signal for the q(1)=0 digit. Responsive to the S1D pulse, controller 440 produces an ATC pulse (box 1321) to advance template counter 702 in FIG. 7 to its next state. The output of template counter addressing signal TN is then changed so that the q(1)=1 digit template feature set in template store 305 is transferred to DTW distance generator 307. In the absence of an ATD (all templates done) signal shown at decision box 1323 from comparator 704, controller 440 generates an IRC (initialize repetition counter) pulse illustrated in box 1301 responsive to the signals applied to gate 442. Repetition counter 601 is then reset to its zero state and an SDG signal is produced by controller 440.

As described with respect to the q (1)=0 digit, the SDG, DGD and ARC control signal sequence (boxes 1303, 1307 and 1309) produces the set of distance signals $D_{q(1)}^{n1}$, $D_{q(1)}^{n1-\delta}$, . . . , $D_{q(1)}^{n1-N\delta}$ for the digit q(1)=1 of the first word position. The distance signals and the segment ending frame signals obtained in the repeated time warping operations for q(1)=1 are stored in string selector 309. Upon completion of the q(1) digit processing in generator 307, the minimum distance signal for the $q_1(1)$ digit is determined and stored responsive to the SS1 signal (box 1315) from controller 440. As aforementioned, selector 309 may comprise the Micro Nova MP100 system, MP/100 4K/8K Memory MP100 8K programmable memory and one or more 4222 interface units described with respect to generator 307. The permanently stored instruction codes controlling the selector operation are listed in FORTRAN language in Appendix B.

After all repetitions for the final first position q(1)=9 digit are completed and the q(1)=9 minimum distance signal is stored in selector circuit 309, controller 440 produces an SS2 signal (box 1325) responsive to enabled ATC and ATD signals (boxes 1321 and 1323) at AND-gate 453. At this time, template counter 702 is in its last template ($Q^{th}$) state and the ATD (all templates done) signal is enabled. The SS2 pulse from controller 440 is operative to initiate the selection of first word position candidates. In this selection, the minimum of the stored best matching distance signals for $q(1)=0,1,2,\ldots,9$ is determined. Its distance value $D''_{q(1)}$ is then compared to the predetermined threshold distance in selector 309. If $D''_{q(1)}$ is less than the threshold, the distance value is retained as a first word position candidate distance. The first word position identification code T1 and the ending frame code for the selected candidate $ENF_c(1)$ is also stored. The remaining minimum difference signals which are within a preassigned distance of the first selected candidate are also retained along with their template identification and ending frame codes as first word position candidates. In general, only one or two candidates are found in each word position partitioning. Signal SS2 also resets flip-flop 592 to activate the INS signal therefrom.

Assume for purposes of illustration that two candidate digits, 5 and 9, are selected from the first word position of the utterance. The minimum of the best matching time warping distance $D''_{q(1)}$ is 0.44 for $q(1)=5$ and the ending frame $EFN_5(1)$ is 36. The best matching time warping distance within the preassigned distance of $q(1)=5$, is 0.48 for $q(1)=9$ and the corresponding ending frame $ENF_9(1)$ is 24. At this time, the identification, ending frame, and distance signals for the first position candidates 5 and 9 are inserted into candidate string store 311 shown in greater detail in FIG. 5.

Figure 5:
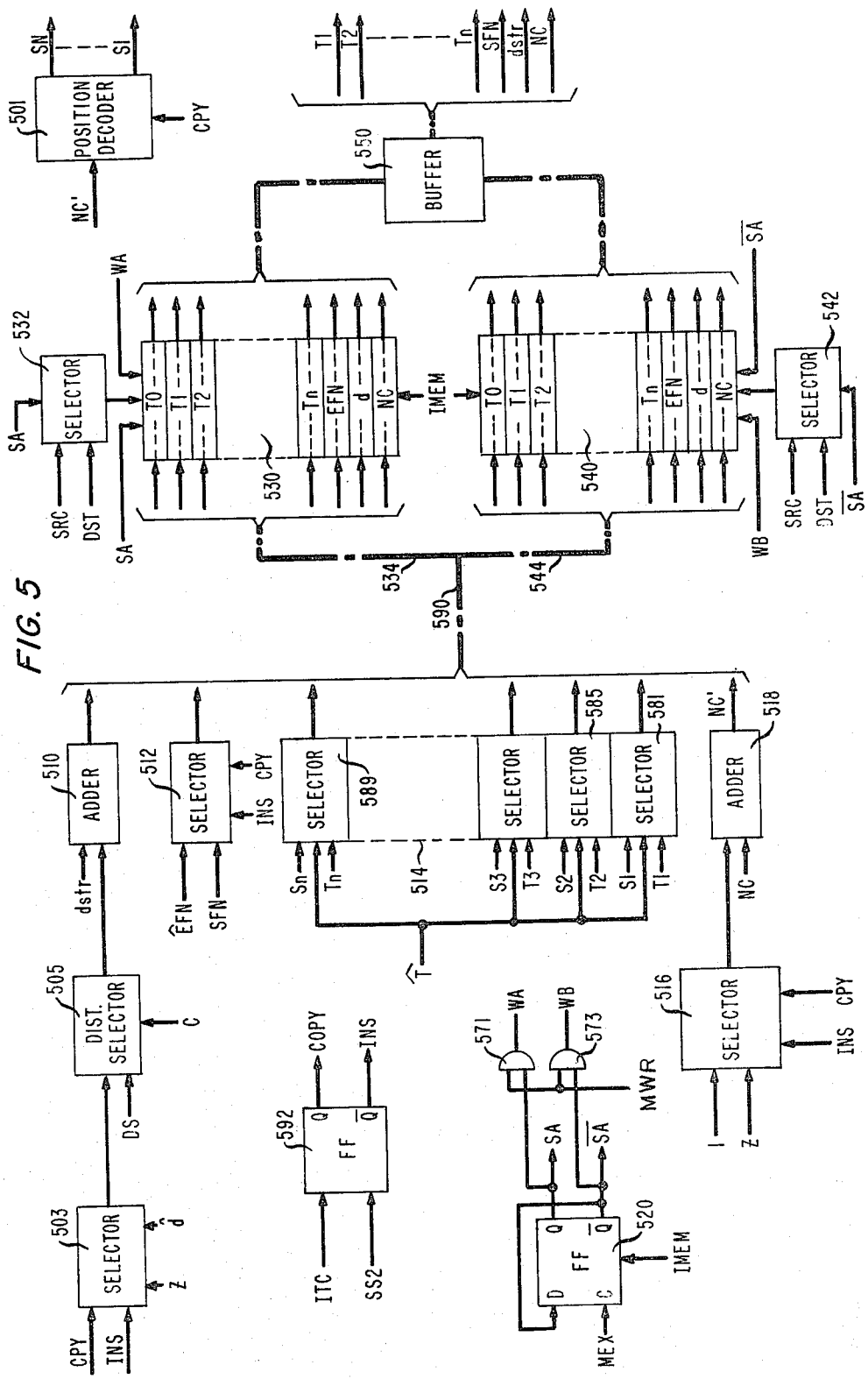
FIG. 5 depicts a memory circuit which may be used as the candidate string store of FIG. 3.

As shown in FIG. 5, the candidate string store includes a pair of memories 530 and 540. These memories were previously cleared by signal IMEM at time $t_4$ on FIG. 12 so that all memory positions were reset to zero. At the end of the first utterance DTW segmentation, and selection the identification, distance, and ending frame information for each generated candidate is inserted into memory 530 as addressed by the output of DST (destination) counter 1103 in candidate string store control circuit 345.

Destination counter 1103 as well as SRC (source) counter 1101 were previously reset to their one states by signal ISD at time $t_4$ in FIG. 12. Consequently, both source and destination counters 1101 and 1103 provide one outputs. Flip-flop 520 was placed in its set state by signal IMEM whereby the SA signal therefrom is enabled and signal $\overline{SA}$ is not enabling. Responsive to signal SA from flip-flop 520, the output of destination counter 1103 is supplied to memory 530 via selector 532. The output of selector 532 addresses the first candidate string position of memory 530. Signal $\overline{SA}$ controls selector 542 so that the source signal SRC now addresses the first candidate string position in memory 540.

In the candidate string storage operation for the first word position, the zero valued signals in the frist candidate position of memory 540 is supplied to buffer 550. In general, the output from buffer 550 includes the identification codes for each digit position $T1,T2,\ldots,Tn$, the ending frame number for the last stored candidate string $SFN(k)$, the accumulated distance for the candidate string $d_{str}$, and the number of digits in the candidate string NC. The signals from buffer 550 are supplied to the inputs of adder 518, selectors 581 through 589, selector 512, and adder 510. The signals from buffer 550 are updated in these selectors and adders and the updated signals therefrom are inserted into memory 530 via lines 590 and 534.

After each word position, the state of flip-flop 520 is reversed by signal MEX so that signal, SA and signal $\overline{SA}$ are alternately enabling. The signals in one of memories 530 and 540 are then read out of buffer 550 and the updated signals are written into the other memory. In this manner, the results of each partitioning are supplied to candidate string store 311 and the partial candidate string selection signals are updated.

Upon completion of the selection of the first word position candidates 5 and 9, signals S2D (box 1329) is emitted from string selector 309. During the string selection, the number of selected digits for the word position is counted and stored as signal M. Signal M is applied to comparator 1005 in candidate status circuit 340 wherein it is compared to a zero code Z. In the event there were no candidate digits in the first word position, $M=0$ and the ZC output of comparator 1005 is enabled. Responsive to the S2D signal from string selector 309 and signal ZC, gate 415 is activated. Signal FIRST is enabled during the first word position and general controller 401 generates an RPT signal reponsive to the operation of AND gate 417. The RPT signal is supplied to utilization device 315 to indicate that the recognition operation should be restarted or aborted.

Since there are two candidates in the first word position, $M=2$ and the $\overline{ZC}$ signal from comparator 1005 are enabling. An SC2 signal (waveform 1235) is produced in general controller 401 at time $t_{20}$ responsive to the operation of AND-gate 419. The SC2 signal is supplied to candidate string store controller 480 via OR-gate 483 so that signals MWR and IDST are produced.

Signal MWR (waveform 1237) causes the signals on line 539 to be inserted into memory 530 at time $t_{21}$. Signal IDST (waveform 1239) then increments destination counter 1103 at time $t_{22}$. In this manner, the first candidate string position of memory 530 is addressed through selector 532. Since memory 540 was initially cleared, the addressing of this memory produces all zero signals in buffer 550. The NC signal from buffer 550 is supplied to one input of adder 518. A one signal is applied at the other input of adder 518 responsive to the INS (insert) signal from flip-flop 592 applied to selector 516. The NC' output of adder 518 is applied to the first word position of the NC row of memory 530 via lines 590 and 534. The NC' word position signal from adder 518 is also supplied to position decoder 501 which enables line S1 to selector 581. The candidate identification signal T corresponding to the digit 5 from string selector 309 is passed through selector 581. The remaining identification selectors pass the signals $T2,T3,\ldots,Tn$ from buffer 550. In this manner, the $T_1$ row of the first candidate string of memory 530 receives the identification signal for digit 5. The remaining first word position identification rows receive the zero valued $T2,T3,Tn$ outputs from buffer 550.

Selector 512 is enabled by signal INS, and the EFN signal from string selector 309 is supplied to the first candidate string position of the EFN row of memory 530. The $d_{str}$ accumulated distance output of buffer 550 is applied to one input of adder 510. The $d$ signal from string selector 309 is passed through distance selectors 503 and 505 responsive to signal INS. The resulting sum from adder 510 corresponding to the accumulated distance signal for the 5 digit is supplied to the $d_{str}$ row of first partial candidate word position of the memory 530.

Responsive to the MWR signal from controller 480 at time $t_{21}$, gate 571 is enabled to produce a WA signal. The WA signal is supplied to memory 530 and causes the updated candidate string signals to be inserted into memory 530. The updated string signals stored in memory 530 for the candidate digit 5 are listed in the first candidate string row of table 1. After the signals are inserted into the first candidate string position of memory 530 responsive to signal WA, the IDST signal from OR-gate 487 occurring at $t_{22}$ increments candidate counter 1001 in FIG. 10 and DST counter 1103 to their two states. The candidate counter output is compared to signal M in comparator 1003. Signal M corresponds to the total number of first word position candidates. The C1D signal from comparator 1003 is enabled after controller 480 produces a second signal MWR at time $t_{23}$ to write the signals from cable 534 into the second candidate string position of memory 530.

Counter 1103 is in its second state so that the second word position of memory 530 is addressed via selector 532. At this time, the identification, distance, and ending frame number signals corresponding to the selected digit 9 are stored in the second candidate string position of memory 530. Buffer 550 still provides zero signals on all lines therefrom. The $\bar{T}$ signal from string selector 309 corresponds to digit 9. The $d_{str}$ signal for the 9 digit is 0.48 and the ending frame EFN signal is 24. As described with respect to the storage operations for the preceding selected digit (5), the NC code from buffer 550 is incremented by one in adder 518 and the updated $NC'=1$ signal is supplied to the NC row of the second candidate string position of memory 530. The $\bar{T}$ identification signal from string selector 309 passes through selector 581 responsive to the enabled S1 signal from decoder 501. In this manner, the T1 row of the second candidate string position of memory 530 is supplied with a code corresponding to the selected digit 9.

The $d_{str}$ signal output of selector 309 passes through distance selectors 503 and 505 to adder 510. The resultant accumulated distance signal $d_{str}$ for the second candidate string of the first word position is thereby applied into memory 530. In like manner, the ending frame signal corresponding to the second candidate string of the first word position is also supplied to memory 530 via selector 512. Signal WA from gate 571 inserts the signals from cable 534 into memory 530 responsive to the MWR pulse at $t_{23}$.

Table 1 lists the contents of memory 530 after the second candidate string signals are inserted therein.

TABLE 1

| Candidate String Pos. | String Identification | | | | | SFN | $d_{str}$ | NC |
|---|---|---|---|---|---|---|---|---|
| | T1 | T2 | T3 | T4 | T5 | | | |
| 1 | 5 | 0 | 0 | 0 | 0 | 35 | 0.44 | 1 |
| 2 | 9 | 0 | 0 | 0 | 0 | 24 | 0.48 | 1 |

As indicated in Table 1 there are two candidate digits for the first word position. These candidate digits are selected in accordance with the string distance signals $d_{str}$. The string distance signal $d_{str}$ for the digit 5 is the minimum of the distance signals found during the first partitioning. The digit 9 is selected because its accumulated distance signal is only slightly larger than that for digit 5. The ending frame for digit 5 is 35 and for digit 9 is 24.

After the two first position partial candidate strings are stored in memory 530, the next IDST signal from OR-gate 487 at time $t_{24}$ passes through AND gate 485 in the presence of previously enabled signal C1D. String store controller 480 is thereby signaled to terminate the memory storing operations for the first word position and controller 480 produces a C2D signal. The C2D signal is supplied to general controller 401 via OR-gate 426 so that an ISN pulse (waveform 1241) is enabled at time $t_{26}$. Prior to time $t_{26}$, the output of source counter 1101 is a one code. Latch 1105 was initially set to its one state by a preceding ISD signal at time $t_4$. Consequently, the DAS output of comparator 1107 is enabling.

Jointly responsive to the ISN and DAS signals, gate 428 causes controller 401 to produce signals LDST and MEX at time $t_{27}$. Signal MEX (waveform 1243) reverses the state of flip-flop 520. During the second word position segmentation, the signals from memory 530 are transferred to buffer 550 and the modified candidate string signals is inserted into memory 540 via cable 544. The LDST signal from controller 401 enables latch 1105 whereby the 2 output of DST counter 1103 is inserted therein for the next word position. The count in DST counter 1103 corresponds to the number of partial candidate reference word series of the first word position in memory 530. Latch 1105 now contains the number of source candidate strings in of memory 530. These strings are read from memory 530 in the second word position and the endpoints thereof are used to determine the predetermined segment beginning range for the second word position.

Prior to the second word position segmentation, the ending frames for the strings in memory 530 must be tested to detect whether the just finished word position is the final word position for the utterance. The final position detection is accomplished in detector 335 shown in greater detail in FIG. 8. Flip-flop 815 is placed in its set state at the beginning of each partitioning by signal ISD. As each EFN signal is transferred from string selector 309 to candidate string store 311, it is also applied to one input of comparator 805. Comparator 805 receives signal FE corresponding to the utterance end range from latch 801 and provides an output for each EFN signal which is less than the $U_5-\Delta$ signal from latch 801. If any transferred EFN signal from selector 309 is less than the end range signal for the utterance, flip-flop 815 is reset and signal $\overline{EDP}$ therefrom is enabled while signal EDP (waveform 1245) is disabled. A final position detection signal EDP is produced when all EFN signals in a word position are equal to or greater than the utterance termination range signal in latch 805. At the time signal MEX is active, the output of flip-flop 815 is inspected in gates 403 and 430. Assume for purposes of illustration that the first word position segmentation does not result in the detection of the final position. Gate 403 is activated by signals MEX and $\overline{EDP}$ so that controller 401 produces a second ISD signal at time $t_{27}$ which initiates the second word position processing.

In the second and subsequent word positions an utterance segment is added for each candidate string in store 311 responsive to the dynamic time warp partitioning for the utterance feature signals in store 310. The initial frame for the second partitioning is the ending frame EFN for the string in store 311 as signal SFN. The beginning point for each string is supplied to frame address circuit 320 from candidate string store 311. DTW partitioning generator 307 determines the distance signals for the overlapping segments of each template under control of frame address circuit 320 as described with respect to the first segmentation. The best matched string is selected in string selector 309 for each template and the minimum distance template of the best matched distance signals is selected for transfer to partial candidate string store 311. The string store then receives the set of template identification, ending frame number, and distance signals which meet the prescribed distance threshold criteria. These signals augments the string signals in store 311 and are combined with the stored partial candidate string information of the preceding word position in the memory. While the sequence of candidate strings are processed in store 311, the newly added candidate segment endpoints are compared to the utterance termination range in final interval detector 335.

At the beginning of the second word position partitioning ($t_{27}$ in FIG. 12), signal ISD resets SRC counter 1101 and DST counter 1103 to their one states. Controller 401 then produces an ITC signal at time $t_{28}$ which is effective to reset template counter 702 to its zero state. Signal ITC also sets flip-flop 380 whereby the feature vector signals for the zero digit template in store 305 are transferred to generator 307. Comparator 820 of final interval detector 335 is now operative to compare the SFN(2) starting frame number of the first partial candidate string (5) stored in memory 530 to the utterance termination range. If the starting frame member is within the predetermined utterance termination range, signal SAE is produced.

Signal SAE occurs when a candidate string no longer has feature signals to be analyzed. Since no additional digits can be added to the string, the recognizer circuit is operative to transfer the candidate string from store 530 to store 540 without alteration. The transfer is accomplished in the following manner. Signal ITC from general controller 401 sets flip-flop 592 in FIG. 5 so that the CPY output therefrom is enabled. Responsive to the enabled $\overline{SA}$ and disabled SA signals from flip-flop 520, selector 542 addresses the first candidate string position of memory 540. Selector 532 addresses the first memory string position of memory 530. The output of memory 530 appears in buffer 550. The CPY signal applied to selectors 503 and 505 cause a zero code signal to be transferred from the input of selector 503 to the input of adder 510. Thus, the distance output of the first candidate string in memory 530 is applied to the input of memory 540 via adder 510. A zero signal is supplied to selector 516 responsive to the CPY output of flip-flop 592 whereby the NC signal from memory 530 is transferred without change into memory 540. Position decoder 501 is inhibited by signal CPY so that the T1,T2,Tn outputs from memory 530 are placed in the corresponding positions of memory 540.

Jointly responsive to the ITC and SAE signals applied to gate 412, general controller 401 produces an MWR and an IDST1 signal. The MWR signal is supplied to gates 571 and 573 so that the signals applied to memory 540 via cable 544 are inserted in the first candidate storing position therein. The IDST1 signal causes an IDST signal to appear at the output of OR-gate 487 whereby the DST counter 1103 is incremented. In this manner, the second string position of memory 540 is now addressed via selector 542. Signal IDST1 also passes through gate 426. Controller 401 produces an ISN signal responsive to the operation of gate 426. Since source counter 1101 is in its first state, the $\overline{DAS}$ output of comparator 1107 is enabled and another ITC signal is produced via AND-gate 407, OR-gate 410 and general controller 401. Source counter 1101 is incremented by the ISN pulse so that the second candidate string in store 530 is addressed after the first string is copied from memory 530 to memory 540.

The dynamic time warping for the first candidate string in the second word position partitioning begins at frame SFN=35 which frame is substantially less than the utterance termination frame (100) stored in latch 801. Consequently, signal $\overline{SAE}$ rather than SAE is enabled at time $t_{29}$. Responsive to the $\overline{SAE}$ and ITC signals, general controller 401 transmits an SC1 pulse (waveform 1219) to segmenting controller 440 via OR-gate 444 at $t_{30}$. Counter 601 in repetition counter circuit 330 and $\delta$ counter 901 in frame address circuit 320 are reset to their zero states by the IRC output of controller 440 at time $t_{31}$. Thus, the first frame position of utterance store 310 to be addressed is frame position $n_2$ (EFN(2)=35). The IRC signal is supplied to OR-gate 448 to start the second word position DTW segmentation and selection. These operations are generally indicated in FIG. 12 between times $t_{31}$ and $t_{50}$. Signal IRC (box 1301) causes controller 440 to apply an SDG signal to DTW partitioning generator 307. As a result of the dynamic time warping operations of generator 307, the distance signals $D_{q(2)}{}^{n2}, D_{q(2)}{}^{n2-\delta}, \ldots D_{q(2)}{}^{n2-N\delta}$ for the q(2)=0 digit template and the corresponding interval endpoint frame numbers EFN(2) are stored in string selector 309. At the end of each warping, repetition counter 601 and $\delta$ counter 901 are incremented by the ARC signal (box 1309) produced in controller 440 responsive to the DGD signal (box 1307) from generator 307. During the final repetition dynamic time warping for the zero digit, the ARD signal (box 1313) from comparator 603 is enabled. The ARC and ARD signals at the end of the $N^{th}$ time warping enable gate 451 so that an SS1 select signal (box 1315) is produced by controller 440. Responsive to the SS1 control signal, the best matched distance signal for the zero digit $D'_{q(2)}$ is selected in string selector 309. Upon completion of the selection, the S1D signal from selector 309 causes controller 440 to generate an ATC advance template counter signal which increments template counter 702 in template address circuit 325. The operations of generator 307 and string selector 309 with respect to the distance signals $D_{q(2)}{}^{n2}, D_{q(2)}{}^{n2-\delta}, \ldots D_{q(2)}{}^{n2-N\delta}$ for q(2)=1 in the second word position are then performed under control of controller 440. After the selection of the best matched distance signals for the digits 0 through 9 in the second word position for the first partial candidate series of the first word position, signal ATD (box 1323) from comparator 704 and signal ATC (box 1321) from the output of controller 440 enable AND-gate 453. Controller 440 then produces an SS2 signal (box 1325). The SS2 signal causes string selector 309 to select the minimum $D''_{q(2)}$ of the best matching template digit signals $D'_0, D'_1, \ldots D'_q$ for the second word position where the minimum $D''_{q(2)}$ is below the predetermined threshold set in the selector. As previously described with respect to the first word position partitioning, other distance signals are selected as additional candidates where their distance signals are within a predetermined range of the minimum distance candidate.

Assume for purposes of illustration that the minimum of the best matched candidate distance signals is found for the zero digit and no other digit candidates are obtained in the second word position partitioning of the first candidate string (5). The S2D signal (box 1329)

produced in string selector 309 after the selection of the zero digit is supplied to an input of gate 417. The other input of this gate is obtained from comparator 1005 in candidate status circuit 340. Since an M=1 signal is applied to the candidate status circuit from string selector 309, comparator 1005 produces a $\overline{ZC}$ signal. Gate 419 in FIG. 4 is enabled and an SC2 signal is sent from general controller 401 to string store controller 480 via OR-gate 483.

During the next time interval, the first candidate string of the first partitioning in memory 530 is augmented by the distance, identification and ending frame signals from string selector 309. The resulting candidate string is then inserted into the first string position of memory 540. At the beginning of the transfer, the output of SRC counter 1101 addresses the first candidate string position of memory 530 via selector 532 under control of signal SA from flip-flop 520. The output of DST counter 1103 addresses the first candidate string position of memory 540 via selector 542. The first candidate string signals from memory 530 are available at the output of buffer 550. Flip-flop 592 is reset so that signal $\overline{INS}$ is obtained therefrom. Consequently, adder 518 is operative to augment the NC=1 signal from buffer 550 by 1.

The NC'=2 signal is supplied to memory 540 via cable 544. The NC' signal also causes the S2 output of position decoder 501 to be enabled. Thus, the template identification signal from string selector 309 is passed through selector 585 to the input of memory 540. In like manner, selector 512 is enabled to transfer the EFN ending frame signal from string selector 309 to the input of memory 540, and the distance signal d from the string selector 309 is added to the accumulated distance signal from buffer 550. The resultant sum from adder 510 is supplied to the input of memory 540 via cable 544.

Signal SC2 at time $t_{50}$ causes controller 480 to generate an MWR signal at time $t_{51}$ as well as a delayed IDST signal at time $t_{52}$. The MWR signal is applied to AND-gate 573 from which a WB memory insert pulse is supplied to memory 540. The candidate string signals at the input of memory 540 are thereby inserted into the first candidate string position thereof. At this time the C1D signal from comparator 1003 is enabled responsive to the one signal from candidate counter 1001 and the M=1 signal corresponding to the single candidate found in string selector 309. The IDST signal from OR-gate 487 passes through AND-gate 485 and causes controller 480 to produce a C2D signal. The C2D signal is in turn applied to controller 401 which produces an ISN pulse at time $t_{53}$.

At this time, the SRC counter is still in its first state and latch 1105 contains a two code corresponding to the number of candidate strings placed in memory 530 during the first word position. Consequently, a $\overline{DAS}$ signal is obtained from comparator 1107. Jointly responsive to the ISN and $\overline{DAS}$ signals at gate 407, general controller 401 produces a second ITC signal at time $t_{54}$. The ITC signal resets template counter 702 to its zero state. The ISN signal also increments SRC counter 1101 to its second state so that the second candidate string in memory 530 is addressed. Comparator 820 in final interval detector 335 now compares the SFN signal from the second candidate string in memory 530 to the termination signal in latch 801. The frame number in memory 530 corresponding to the 9 digit is 24. Since this frame number is less than the termination frame in latch 801, the $\overline{SAE}$ signal is enabled at time $t_{55}$ and general controller 401 produces an SC1 pulse at time $t_{56}$ responsive to the operation of AND-gate 413.

The SC1 signal activates controller 440 as generally indicated in FIG. 12 between times $t_{60}$ and $t_{70}$. Responsive to control signals from controller 440 illustrated in FIG. 13, partitioning generator 307 successively produces the distance signals corresponding to the second candidate string. The minimum of each digit distance signal is stored in selector 309. As previously described, string selector 309 is then operative to select the second word position candidates for the second partial candidate string of the first word position.

Assume for purposes of illustration that the zero digit template is found to provide the minimum of the best matching distance signals for all templates to be added to the second candidate string and that the ending frame for the utterance interval found during the overlapping interval warping is 72. The resulting template identification ending frame number and distance signals are then combined with the second candidate string signals from memory 530. The resulting candidate string is then placed in the second candidate string position of memory 540 as addressed by DST counter 1103. The storage process is done under control of string store controller 480 as previously described with respect to the storage of the first candidate string 50.

SRC counter 1101 is in its second state during the storage operation of the second candidate string. Since the output of counter 1101 matches the output of latch 1105, the DAS signal from comparator 1107 is enabled. Candidate counter 1001 is in its one state and an M=1 signal is obtained from string selector 309. Thus, signal C1D from comparator 1003 is enabled. The IDST signal for the second candidate string transfer is then passed through gate 485 whereby a C2D signal is produced in controller 480. The C2D signal causes general controller 401 to generate an ISN signal via gate 417 at time $t_{71}$. Gate 428 is then enabled by the ISN and DAS signals so that controller 401 produces an MEX (memory exchange) and LDST signals at time $t_{72}$. The LDST signal is applied to latch 1105 whereby the two code in DST counter 1103 is transferred into the latch. The MEX signal reverses the state of flip-flop 520. Memory 540 is thereby conditioned to supply signals to buffer 550 while memory 530 is conditioned to receive signals from cable 534.

During the transfer of the selected candidate signals from string selector 309 to candidate string store 311 in he second word position, final interval detector 335 is operative to determine whether the second position ending frame signals are within the prescribed range of the utterance termination. As described with the previous word position flip-flop 815 is initially set by the ISD signal at time $t_{27}$. Comparator 805 is operative to compare the ending frame number signals from string selector 309 to the utterance termination frame signal. In the event that all ending frame signals applied to comparator 805 are equal to or greater than the utterance termination frame, flip-flop 815 remains set. In the second partitioning, however, the EFN signals are less than the utterance termination so that signal $\overline{EDP}$ is enabled. The MEX and $\overline{EDP}$ signals are utilized in AND-gate 403 to initiate the third word position processing.

Table 2 shows the contents of memory 540 at the end of the second partitioning.

TABLE 2

| Candidate String Pos. | String Identification | | | | | SFN | $d_{str}$ | NC |
|---|---|---|---|---|---|---|---|---|
| | $T_1$ | $T_2$ | $T_3$ | $T_4$ | $T_5$ | | | |
| 1 | 5 | 0 | 0 | 0 | 0 | 72 | 0.80 | 2 |
| 2 | 9 | 0 | 0 | 0 | 0 | 72 | 0.74 | 2 |

As indicated in Table 2 there are two candidate strings selected on the basis of the overlapping utterance interval partitioning. Candidate string 90 has an ending frame of 72 and an accumulated distance over the two selected digits of 0.74. Candidate string 50 also has an ending frame of 72 and has an accumulated distance over the 50 string of 0.80. No other candidate strings meet the prescribed distance threshold criteria stored in string selector 309. Since the EFN(2) signals 72 are smaller than the utterance termination point, a third word position is required to complete the candidate strings for the input utterance.

The third word position segmentation is initiated by the ISD signal produced by general controller 401 at time $t_{73}$ responsive to the enabling of AND-gate 403 by signals MEX and $\overline{EDP}$. At the beginning of the third word position both SRC counter 1101 and DST counter 1103 are reset to their first states. Thus, the signals from the first candidate string in memory 540 are supplied to buffer 550 and the first candidate string position of memory 530 is addressed. When signal ITC is produced at time $t_{74}$ responsive to the operation of gate 410, template counter 702 of template address circuit 325 is reset and the ending frame of the first candidate string in memory 540 is supplied to final interval detector 335 as signal SFN. As illustrated in FIG. 8, the SFN signal for the candidate string is compared to the termination frame of the utterance. Since the SFN=72 code is less than the code stored in latch 801, signal $\overline{SAE}$ is enabled by comparator 820 at time $t_{75}$. In the event the SAE signal is obtained from comparator 820, the MWR and IDST1 signals are generated and the first candidate string is transferred without alteration into the first candidate string position of memory 530.

At time $t_{76}$, controller 401 generates a SC1 signal responsive to the operation of AND-gate 413. The third word position then proceeds as generally indicated between $t_{77}$ and $t_{90}$ in FIG. 12. Dynamic time warping generator 307 and string selector 309 are rendered operative by signals from partitioning controller 440 to produce the distance codes, template identification signals, and ending frame signals for each of the templates obtained from store 305. As described with respect to the first and second partitioning operations, generator 307 receives the feature vector signals $R_{q(3)}$ for each digit $q(3)=0,1,\ldots 9$ from template store 305. Utterance intervals and distance signals are determined for the template feature vector signals and the resulting distance signals $D_{0(3)}^{n3}$, $D_{0(3)}^{n3-\delta}$, ... $D_{0(3)}^{n3-N\delta}$ for the zero digit are placed in selector 309 responsive to signal SS1 from controller 440. The best matching distance signal $D'_{0(3)}$ is stored in string selector 309 and the time warping distance generation in generator 307 is reinitiated for the next digit by signal SDG. After all the best matching distance signals $D'_{0(3)}$, $D'_{1(3)}$, ... $D'_{9(3)}$ are placed in selector 309, signal SS2 causes the minimum of the best matching distance signals $D''_{q(3)}$ and those within a predetermined threshold of said minimum to be selected. For purposes of illustration, it is assumed that the minimum of the best matching distance signals is obtained for the digit 7 and that the best matching distance signal for the digit 6 is within the preassigned distance of the distance signal for digit 7.

The first candidate string 50 stored in memory 540 during the second word position results in two candidate strings 507 and 506 in the third word position. After the digits 6 and 7 are selected in string selector 309 for the first candidate string 50, signal S2D passes through gate 417 and causes controller 401 to produce an SC2 signal. The SC2 signal is applied to string store controller 480 which initiates the modification of the first candidate string in memory 540. At this time, SCR counter 1101 and DST counter 1103 are in their first states so that the first candidate positions in memories 540 and 530 are addressed. Flip-flop 520 is set whereby the first string position of memory 540 is supplied to buffer 550 and memory 530 is adapted to receive signals from cable 534. Candidate counter 1001 is in its first state and the $\overline{C1D}$ signal from comparator 1003 is enabled.

As previously described with respect to the preceding word positions, adder 510 is operative to sum the distance signal $d_{str}$ and the distance signal corresponding to digit 7 from string selector 309. The resulting sum is applied to the input of memory 530. Similarly, selector 512 receives the ending frame EFN(3) for the digit 7 from string selector 309 and supplies this ending frame signal to memory 530. Adder 511 is effective to augment the NC word position signal from buffer 550 so that the identification code $\hat{T}$ for the digit 7 is supplied to cable 534. When the MWR pulse is obtained from controller 480, gate 571 is enabled and the WA signal therefrom inserts the signals on cable 534 into the first candidate string position of memory 530.

Subsequent to the insertion into memory 530, signal IDST is obtained from OR-gate 487. The IDST signal increments candidate counter 1001 and DST counter 1103 to their second states. In this way, the second candidate string position of memory 530 is addressed. Since SRC counter 1101 remains in its first state, the signals from the 50 candidate string in memory 540 are augmented by the outputs of string selector 309 and the resultant string signals for the 507 string are made available at the input of memory 530. The IDST signal also passes through AND-gate 481 and OR-gate 483 so that a second MWR signal is produced by controller 480. The second MWR signal inserts the signals for candidate string 506 into memory 530. Candidate counter 1001 is now in its second state whereby signal C1D from comparator 1003 is enabled. The next IDST signal from gate 487 then passes through AND-gate 435 to generate a C2D signal. The C2D signal indicates the termination of the transfers of the candidate string 507 and 506 into memory 530.

Signal C2D is applied to general controller 401 via OR-gate 419. The ISN signal produced by controller 401 at this time enables AND-gate 407 and increments SRC counter 1101 to its second state. With counter 1101 in its second state, the second candidate string position of memory 540 (string 90) is addressed. DST counter 1103 has been incremented to its third state so that the third candidate position of memory 530 is addressed. Generator 401 produces an ITC signal responsive to enabled gate 407. This ITC signal resets template counter 702 in template address circuit 325 and alerts AND-gate 413. The SFN signal corresponding to the second candidate string in memory 540 is supplied to comparator 820 where it is compared to the utterance termination frame stored in latch 801. Since SFN frame 72 from memory 540 is less than the utterance termination frame, an SAE signal is produced by comparator 820. Generator 401 then provides an SC1 signal to enable DTW controller 440.

Controller 440 is operative to activate generator 307 and string selector 309 so that third word position digits may be selected for the string 90 in memory 540. Assume for purposes of illustration that digits 7 and 6 are also selected in string selector 309 for the 90 candidate string in memory 540. At the end of the selection of the 7 and 6 digits for the 90 string in selector 309, signal S2D is produced. Signal S2D causes controller 401 to activate signal SC2. Signal SC2 then is applied to string store controller 480 and the memory transfer operations for the second candidate string in memory 540 are initiated. During the memory transfer, the signals for string 90 in the second word position of memory 540 are augmented by the output of selector 309. The signals for the newly generated candidate strings 907 and 906 then sequentially inserted into the third and fourth positions of memory 530 respectively. Table 3 lists the contents of the first four candidate string positions in memory 530 after the termination of the memory transfer for the third digit position.

TABLE 3

| Candidate String Pos. | String Identification | | | | | SFN | $d_{str}$ | NC |
|---|---|---|---|---|---|---|---|---|
| | $T_1$ | $T_2$ | $T_3$ | $T_4$ | $T_5$ | | | |
| 1 | 5 | 0 | 7 | 0 | 0 | 107 | 1.08 | 3 |
| 2 | 5 | 0 | 6 | 0 | 0 | 109 | 1.31 | 3 |
| 3 | 9 | 0 | 7 | 0 | 0 | 107 | 1.02 | 3 |
| 4 | 9 | 0 | 6 | 0 | 0 | 109 | 1.25 | 3 |

As indicated in Table 3, there are four candidate strings each with three digits. The best matching string is 9-0-7 which has an accumulated distance signal over the three digits of $d_{str}=1.02$. The string 5-0-7 has a slightly larger accumulated distance $d_{str}$ and the strings 9-0-6 and 5-0-6 have much larger accumulated distance signals. The ending frames EFN(3) for the candidate strings are 107 and 109. During the transfer of the selected signals from string selector 309 to candidate string store 311, the ending frame signals $EFN_1(3)$, $EFN_2(3)$, $EFN_3(3)$, and $EFN_4(3)$ are supplied to comparator 805 wherein they are successively compared to the stored utterance termination frame of $U_T=100$ in latch 801. Since each ending frame listed in Table 3 is greater than the utterance termination frame, flip-flop 815 remains set throughout the third partitioning. The EDP signal from flip-flop 815 (waveform 1245) signals the occurrence of the final utterance word position.

As previously described with respect to the first and second word position operations, signal MEX occurs on the termination of the last memory transfer of a partitioning (time $t_{90}$ for the third word position). Gate 430 is enabled by signals MEX and EDP and controller 401 sends an SC3 signal to reconstruction controller 460 at time $t_{91}$. Controller 460 is operative to cause the circuit of FIG. 3 to produce the reference digit feature signals $R^S = R_{q(1)} + R_{q(2)} + R_{q(3)}$ corresponding to each candidate string in store 530. An accumulated distance signal between the utterance feature signals and the $R^k$ for each string is produced. The distance signal $d_{str}$ in memory 530 is added to the string distance signal for reference string $R^S$ and the result is stored in memory 540. Candidate selector 313 then selects the string with the minimum distance signal of $(d_{str}+Ds)$ as the utterance identification. Alternatively, the $d_{str}$ signals for the candidate strings may be processed and the utterance identified as the minimum $d_{str}$ string or the $D_s$ signals can be processed to determine the candidate string that most closely corresponds to the utterance.

Figure 14:
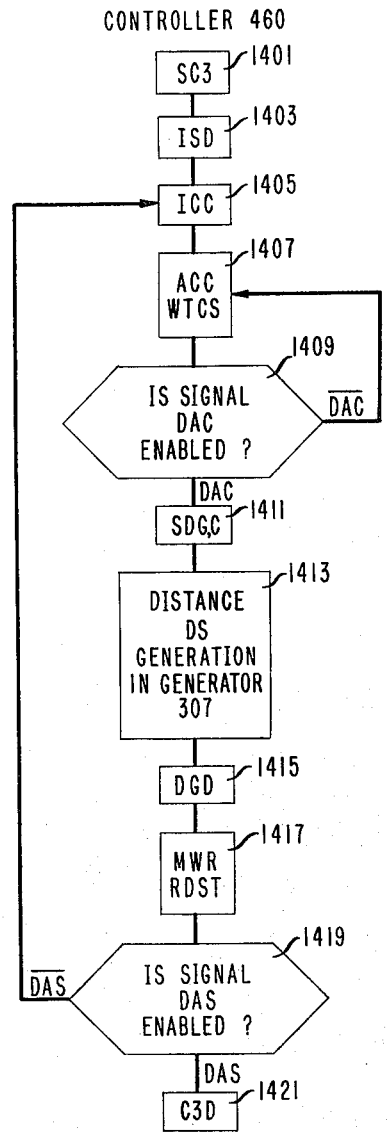

In accordance with the circuit of FIGS. 3 and 4, signal SC3 from controller 401 causes controller 460 to produce an ISD signal. The sequence of signals for the operation of controller 460 is illustrated in the flow diagram of FIG. 14. As previously described, signal ISD resets SRC counter 1101 and DST counter 1103 to their first states. The ISD signal illustrated in box 1403 of FIG. 14 is also supplied to controller 460 via OR-gate 464 so that an ICC signal (box 1405) is obtained from the controller. Signal ICC resets word position counter 387 to its one state, places flip-flop 380 in its reset state and generates signals ACC and WTCS (box 1407) in controller 460. Responsive to the output of counter 387 and the B signal from flip-flop 380, template selector 389 is operative to transfer the T1 identification signal from the first string position in memory 530 to the address input of template store 305. In this way, the reference template feature vector for the digit 5 is made available at the output of template store 305.

Template candidate store 370 is also addressed by the output of word position counter 387 and the reference template feature vector from template store 305 is transferred to candidate store 370 under control of write signal WTCS from controller 460. Counter 387 is advanced to its second state responsive to the ACC pulse (box 1407) from controller 460. The second word position signal at the output of buffer 550 then addresses template store 305 and candidate store 370 whereby the reference template feature vector signals for the digit 0 are transferred from store 305 to candidate store 370.

During the transfer of the third word position reference template feature vector, the DAC signal (box 1409) appears at the output of comparator 365. Jointly responsive to the ACC and DAC signals at AND-gate 469, controller 460 supplies an SDG signal (box 1411) to dynamic time warping distance generator 307. Flip-flop 395 is set by signal SDG and the C signal therefrom is enabled. Generator 307 is rendered operative by the C signal (box 1411) applied thereto from flip-flop 395 to produce a distance signal relating the utterance feature vector sequence from store 310 to the reference feature vector sequence $R^k$ from template candidate store 370. The distance signal from generator 307, DS, is supplied to distance selector 505. Signal C transfers the DS signal to the input of adder 510 wherein the sum of the first candidate string distance signal $d_{str}$ and the distance signal from generator 307 is formed.

Flip-flop 592 is in its set state during this operation so that the CPY output is obtained therefrom. Consequently, the signals at the output of buffer 550, except for the $d_{str}$ signal, are applied unmodified to the input of memory 540. Upon termination of the distance signal formation in generator 307, signal DGD (box 1415) from generator 307 causes controller 460 to produce an MWR write pulse (box 1417). The write pulse inserts the signals on cable 544 into the first candidate string position of memory 540. The distance signal in the first candidate string position of memory 540 is then $d_{str}+DS$.

The RDST signal (box 1417) also produced by the DGD output of generator 307 increments SRC counter 1101 and DST counter 1103 to their second states whereby the second string positions of memories 530 and 540 are addressed. The ICC signal (box 1405) reinitiates word position counter 387 and resets flip-flop 380 so that the dynamic time warping for the second candidate string position of memory 530 is performed responsive to the ACC and SDG signals from controller 460. The distance signal DS resulting from the second candidate string dynamic time warping in generator 307 is added to the $d_{str}$ signal from memory 539 and the sum is inserted in the second string position of memory 540 responsive to the MWR signal (box 1419) from controller 460.

The RDST signal (box 1417) produced after the second candidate string is inserted into memory 540 initiates the reconstruction and dynamic time warping for the third candidate string in memory 530. After the last memory string has been processed under control of controller 460, gate 471 is enabled. Responsive to the operation of gate 471, controller 460 produces a C3D ending pulse (box 1421) which ending pulse is applied to controller 401. The SS3 signal generated by controller 401 at this time is applied to candidate selector 313 which is rendered operative to select the minimum of the distance signals stored in memory 540. Table 4 lists the contents of memory 540 when the C3D signal is produced by controller 460.

As shown in Table 4, the minimum distance signal corresponds to the candidate string 507. Candidate selector 313 is responsive to signal DONE from controller 401 to generate a code corresponding to the selected sequence and to transfer the code to utilization device 315. Candidate selector 313 may comprise the Micro Nova MP100 system, MP/1004K/8K memory, MP 100 8K programable memory and one or more 4222 interface units as described with respect to generators 303, 307 and string selector 309. The permanently stored instructions controlling the candidate selector operation are listed in FORTRAN language in Appendix C. The circuit of FIG. 1 is then reset preparatory to another utterance identification.

Although the invention has been described with reference to a particular illustrative embodiment, it is to be understood that various modifications may be made by one skilled in the art without departing from the spirit and the scope of the invention.

TABLE 4

| Candidate String Pos. | String Identification | | | | | SFN | $d_{str}$ | +DS NC |
|---|---|---|---|---|---|---|---|---|
| | $T_1$ | $T_2$ | $T_3$ | $T_4$ | $T_5$ | | | |
| 1 | 5 | 0 | 7 | 0 | 0 | 107 | 2.30 | 3 |
| 2 | 5 | 0 | 6 | 0 | 0 | 109 | 2.9 | 3 |
| 3 | 9 | 0 | 7 | 0 | 0 | 107 | 2.1 | 3 |
| 4 | 9 | 0 | 6 | 0 | 0 | 109 | 2.7 | 3 |

APPENDIX A

```
      C   DTW DISTANCE GENERATOR
      C   NN=NUMBER OF FRAMES OF TEST (CAN BE ARBITRARILY LARGE)
      C   R=REFERENCE ARRAY OF AUTOCORRELATION OF LPC COEFFICIENTS
   5  C   NM=NUMBER OF FRAMES OF REFERENCE (FIXED TO 40)
      C   DRN=NORMALIZED MINIMUM DISTANCE
          DIMENSION D(NMAX),DCU(NMAX)
          PARAMETER NMAX=2*(IDLT+1), TMIN=1.0,TMAX=0.5,IDLT=8,NE=9,NN=500
          DATA XLRG/1000./
  10      IMIN(IMN)=MAX0(1,IMN-IDLT)
      999 CONTINUE
          IMAX(IMN)=MIN0(NN,IMN+IDLT)
              WAIT (SDG)
              INPUT (C,NC)
  15          NM=40
              IF(C)MM=40+NC
      C   INITIALIZE IR=1 COLUMN FIRST
              ITMN=3
              IT1=IMIN(ITMN)
  20          IT2=IMAX(ITMN)
              XDIST=10000.
              DO 60 IT=IT1,IT2
              CALL DIST(1,IT,DCU(IT-IT1+1))
              IF(DCU(IT-IT1+1).LT.XDIST)XDIST=DCU(IT-IT1+1)
  25   60     CONTINUE
              NFC=1
              DO 65 IT=IT2+1,NMAX
              DCU(IT-IT1+1)=XLRG
       65     CONTINUE
  30          XMNR=10000.
              DO 200 IR=2,MM
              XMND=XLRG
              IT1P=IT1
              IT2P=IT2
  35          IT1=MAX0(IMIN(ITMN),IT1P)
              IT2=MAX0(IMAX(ITMN),IT2P)
              IF(IT2.GT.(IT2P+2))IT2=IT2P+2
              D1=XLRG
              D2=XLRG
  40          IF(IT1-1.GE.IT1P)D1=ABS(DCU(IT1-IT1P))
              IF(IT1-2.GE.IT1-IT1P)D2=ABS(DCU(IT1P-1))
              DO 30 IT=IT1,IT2
```

```
            CALL DIST(IR,IT,D(IT-IT1+1))
   30       CONTINUE
   56       CONTINUE
            DO 100 IT=IT1,IT2
            DO=ABS(DCU(IT-IT1P+1))
            DI=D2
            LPTH=2
            IF(D1-D2)10,11,11
   10       LPTH=1
            DI=D1
   11       IF(DO-DI)12,12,20
   12       CONTINUE
            IF(IT.GT.IT2P)GO TO 21
            IF(DCU(IT-IT1P+1).LT.0)GO TO 20
            LPTH=0
            DI=DO
   20       CONTINUE
   21       CONTINUE
            DI=DI+D(IT-IT1+1)
            IF(XMND-DI)50,50,51
   51       XMND=DI
            ITMN=IT
   50       CONTINUE
            IF(LPTH.EQ.0)DI=-DI
            D2=D1
            D1=DO
            DCU(IT-IT1+1)=DI
   100      CONTINUE
            IF(XMND.GE.XLRG)GO TO 300
            ITSAV=ITMN
            IF(IT2.LT.NN)GO TO 110
            DIN=XMND*FLOAT(MM)/FLOAT(IR)
            IF(XMNR.LT.DIN)GO TO 110
            XMNR=DIN
            IPR=IR
            ITT=ITMN
   110      XTST=AMIN1(XMND,XMNR)
            THR1=(TMIN+((TMAX-TMIN)/(FLOAT(MM)-1))*FLOAT(IR))*MM
            IF(XTST.GT.THR1)GO TO 300
            DO 93 IT=IT2-IT1+2,NMAX
   93       DCU(IT)=XLRG
   200      CONTINUE
            NFC=ITSAV
            IF(XMND.GT.XMNR)NFC=ITT
            DR=AMIN1(XMND,XMNR)
            NFR=MM
            IF(XMND.GT.XMNR) NFR=IRR
            DRN=DR/FLOAT(NFR)
            OUTPUT (DS=DRN,DGD)
            GO TO 999
   300      OUTPUT (DS=0000,DGD)
            GO TO 999
            END
   C        DIST--DISTANCE ROUTINE USING AUTOCORRELATION OF A'S
            SUBROUTINE DIST(IR,IT,DST)
            COMMON CR(9,40),CT(9)
            PARAMETER M=8,ME=M+1
   C
   C        CT=TEST ARRAY
   C        M=8, ME=9
   C        CR=NORMALIZED CORRELATION FUNCTION OF A'S OF REFERENCE FRAME
   C             CR(I)=2*COR(I)/COR(0)WHERE COR IS TRUE CORRELATION OF
   C                   A'S
   C        RC=CR(1,IR)
   C        TC=LOG RESIDUAL ERROR OF TEST FRAME
   C        TC=CT(1,IT)
   C
   C        DST=RC+LOG(ACOR DOT R)-TC
   C        FORM R DOT T AND STORE IN PR1
```

```
C       OUTPUT(FN=IT);READ IN FROM UTTERANCE FEATURE SIGNAL STORE
        INPUT(CT,CR)
        RC=CR(1,IR)
        PR1=0.
5    5  DO 5 I=2,M+1
     5  PR1=PR1+CR(I,IR)*CT(I)
        TC=CT(1)
        PR1=PR1+1.
        IF(PR1.LT.1.E-5) PR1=1.E-5
10      DST=ALOG(PR1)+RC-TC
        RETURN
        END
```

APPENDIX B

```
C       STRING SELECTOR
        PARAMETER K1=4,K2=10
        DIMENSION EFN(K1),DS(K1),TN(K1)
5       DIMENSION EFNH(K2),DH(K2),TH(K2)
        COMMON NT1,NT2
        PARAMETER T1=.6,T2=.08
C       WAIT FOR SOMETHING TO DO
    100 CONTINUE                INIT. OR. DGD
10      WAIT(IN.T.OR. D60 .OR. SS1 .OR. SS2)
        IF(D60) GO TO 200       DGD
        IF(SS1) GO TO 300
        IF(SS2) GO TO 400
C       INITIALIZATION
15      NT1=0
        NT2=0
        GO TO 100
C       TIME WARP DONE (DGD) COLLECT DATA
    200 CONTINUE
20      NT1=NT1+1
        INPUT (EFNT,DST,TNT)
        EFN(NT1)=EFNT
        DS(NT1)=DST
        TN(NT1)=TNT
25      GO TO 100
C       ALL TIME WARPS DONE FOR THIS TEMPLATE
C       PICK BEST MATCH (SS1).
    300 CONTINUE
        C1=DS(1)
30      N1=1
        DO 310 IP=2,K1
        IF (DS(IP).GE.C1) GO TO 310
        C1=DS(IP)
        N1=IP
35  310 CONTINUE
C       N1 NOW POINTS TO SMALLER DISTANCE
C       TRANSFER TO SECOND ARRAY
        NT2=NT2+1
        EFNH(NT2)=EFN(N1)
40      DH(NT2)=DS(N1)
        TH(NT2)=TN(N1)
C       RESET POINTER FOR FIRST ARRAY
        NT1=0         SID
        OUTPUT(S10)
45      GO TO 100
C       ALL TIME WARPS DONE FOR ALL TEMPLATES
C       PICK BEST CANDIDATES AND REPORT.(SS2)
    400 CONTINUE
C       FIRST SORT LIST OF DISTANCES
50      DO 410 K=1,K2-1
        DO 410 KP=K+1,K2
        IF (DK(KP).GT.DH(K)) GO TO 410
        EFNT=EFNH(K)
```

```
        DST=DH(K)
        TNT=TH(K)
        EFNH(K)=EFNH(KP)
        DH(K)=DH(KP)
        TH(K)=TH(KP)
        EFNH(KP)=EFNT
        DH(KP)=DST
        TH(KP)=TNT
410     CONTINUE
C       CHECK DISTANCES AGAINST THRESHOLDS
        M=0
        IF (DH(1).GT.T1)GO TO 450
        M=1
        DO 420 K=2,K2
        IF (DH(K)-DH(1).GT.T2) GO TO 450
        M=K
420     CONTINUE
C       DONE OUTPUT # OF CANDIDATES
        OUTPUT (M,S2D)
C       RESET POINTER FOR SECOND ARRAY
        NT2=0
        GO TO 100
        END
```

APPENDIX C

```
C       BEST CANDIDATE STRING SELECTOR
        PARAMETER NSTRMAX=10   ;NO.CHAR IN STRING(MAX)
        DIMENSION T(NSTRMAX),TBEST(NSTRMAX)
100     CONTINUE
        WAIT (SS3)
        INPUT (NCBEST,DSTRBEST,TBEST) ; GET FIRST CAND.
        INPUT (NSTR)   ; GET OF CAND. STRINGS
        IF(NSTR.EQ.1) GO TO 300 ; ONLY ONE-DONE
        DO 200 J=1, NSTR ; LOOP FOR ALL CAND.
        INPUT (NC,DSTR,T) ; GET NEXT CAND.
        IF(DSTR.GE.DSTRBEST) GO TO 200 ; SMALLER?
        DSTRBEST = DSTR
        NCBEST = NC
        DO 150 I = 1,NC
        TBEST(I) = T(I)
150     CONTINUE
200     CONTINUE
C       DONE  --BEST HAS CANDIDATE STRING WITH
C       SMALLEST DISTANCE
300     CONTINUE
        OUTPUT (NCBEST, DSTRBEST, TBEST)
        OUTPUT (S3D)
        GO TO 100
        END
```

I claim:

1. Apparatus for recognizing continuous speech comprising:

means (105) for storing signals representative of the acoustic features of a set of reference words;

means (103) responsive to an unknown utterance for producing a sequence of signals representative of the acoustic features of the utterance;

means (110,120,130,140,160) responsive to the reference word acoustic feature signals and the utterance acoustic feature signals for generating at least one reference word series as a candidate for said utterance;

and means (170) responsive to said at least one reference word series candidate and said utterance acoustic feature signals for identifying said utterance as one of said reference word series candidates;

characterized in that said reference word series candidate generating means (110,120,130,140,160) comprises;

means (401,340) for generating a signal for identifying successive word position intervals;

means (307,309,311) operative in each successive word position interval for forming reference word series partial candidates including means (307,309,311,320,345) responsive to each reference word series partial candidate of the preceding word position for determining for each reference word a plurality of utterance segments beginning within a predetermined range of the utterance segment endpoint of said preceding word position reference word series partial candidate and corresponding to the reference word feature signals, said range overlapping the preceding word position partial candidate utterance segment endpoint;

means (307,320) responsive to each reference word feature signals and the feature signals of the corresponding determined utterance segments for forming a signal representative of the similarity between said reference word and said utterance segments;

means (309,325) responsive to said similarity signals for selecting reference words having a prescribed similarity to their corresponding utterance segments;

and means (311) for combining said selected reference words with the reference word series partial candidates of the preceding word position to form at least one reference word series partial candidate for said word position interval.

2. Apparatus for recognizing continuous speech according to claim 1 further characterized in that said utterance identifying means (170) comprises means (335) responsive to the endpoints of all reference word series partial candidates of a word position interval being within a predetermined range of the utterance endpoint for generating a selection signal;

and means (311) responsive to the selection signal and said word position similarity signals for generating a signal for each reference word series candidate representative of the correspondence of the reference word series candidate to the utterance; and means (313) responsive to the reference word series candidate correspondence signals for selecting the reference word series candidate most closely corresponding to the utterance.

3. Apparatus for recognizing continuous speech according to claim 1 further characterized in that said utterance identifying means (170) comprises means (335) responsive to the endpoints of all reference word series partial candidates of a word position interval being within a predetermined range of the utterance endpoint for generating a selection signal;

means (365,370,387,389,460) responsive to said selection signal for generating a sequence of feature signals corresponding to each reference word series candidate;

means (311) jointly responsive to each reference word series candidate feature signal sequence and the utterance feature signal sequence for producing a signal representative of the correspondence of the utterance to said reference word series candidate and means (313) responsive to said correspondence signals for identifying the reference word series candidate having the closest correspondence to said utterance.

4. Apparatus for recognizing continuous speech according to claim 3 further characterized in that the word position reference word combining means (311) further comprises means (510) for generating a signal representative of the similarity between each reference word series partial candidate of the word position and the utterance portion corresponding thereto;

and said reference word series candidate identifying means (170) comprises means (503,505,510) for combining the similarity and correspondence signals for each reference word series candidate;

and means (311,313) responsive to said combined similarity and correspondence signals for determining the reference word series candidate most closely corresponding to the utterance.

5. Apparatus for recognizing continuous speech according to claim 4, further characterized in that said utterance segment determining means (307,309,311,320,345) comprises means (901,905,907,909) operative for each reference word series partial candidate of the preceding word position responsive to the series utterance portion endpoint of the preceding word position interval for generating a set of precessed utterance segment beginning points for each reference word of the current word position interval;

said word position interval similarity signal forming means (307,320) comprises means (310,305,307,311) jointly responsive to said set of precessed utterance segment beginning points, the utterance feature signal sequence and the feature signals of said reference word for selecting the utterance segment for said reference word and for generating a signal representative of the distance between the feature signals of the reference word and the feature signals of the selected utterance segment for said reference word.

6. Apparatus for recognizing continuous speech according to claim 5 further characterized in that said word position reference word selecting means (309) comprises means (309,440) responsive to said reference word distance signals of the word position for identifying the reference word with the minimum distance signal below a first preassigned threshold and the reference words with distance signals within a preassigned distance of said minimum distance signal reference word.

7. Apparatus for recognizing continuous speech according to claims 1, 2, 3, 4, 5, or 6 further characterized in that
said signals representative of the acoustic features of a set of reference words are representative of the acoustic features of reference words spoken in isolation.

8. A method for recognizing continuous speech comprising
storing signals representative of the acoustic features of a set of reference words;
producing a sequence of signals representative of the acoustic features of an unknown utterance;
generating at least one reference word series as a candidate for said utterance responsive to the reference word and utterance feature signals;
and identifying the utterance as one of said reference word series candidates;
characterized in that
said reference word series candidate generating step comprises;
generating a signal identifying successive word position intervals for said utterance;
in each identified word position interval, forming reference word series partial candidates including
determining for each reference word series partial candidate of the preceding word position interval a plurality of utterance segments for each reference word beginning within a predetermined range of the utterance segment endpoint of the reference word series partial candidate of the preceding word position and corresponding to the reference word feature signals, said range overlapping the preceding word position partial candidate utterance segment;
forming a signal representative of the similarity between each reference word and the corresponding determined utterance segments responsive to the reference word feature signals and said determined utterance segment feature signals;
selecting reference words having a prescribed similarity to their corresponding utterance segments responsive to said similarity signals;
and combining each selected reference word with the reference word series partial candidates of the preceding word position to form at least one reference word series partial candidate for said word position interval.

9. A method for recognizing continuous speech according to claim 8 further characterized in that
said utterance identifying step comprises generating a selection signal responsive to the endpoints of all reference word series partial candidates of a word position interval being within a predetermined range of the utterance endpoint;
generating a signal for each reference word series candidate representative of the correspondence of the reference word series candidate feature signals to the utterance acoustic feature signals responsive to the selection signal;
and selecting the reference word series candidate most closely corresponding to the utterance responsive to said reference word series candidate correspondence signals.

10. A method for recognizing continuous speech according to claim 8 further characterized in that
said utterance identifying step comprises
generating a selection signal responsive to the endpoints of all reference word series partial candidate of a word position interval being within a predetermined range of the utterance endpoint;
generating a sequence of feature signals corresponding to each reference word series candidate responsive to said selection signal;
producing a signal representative of the correspondence of the utterance to each reference word series candidate responsive to the reference word series candidate feature signal sequence and said utterance acoustic feature signal sequence;
and identifying the reference word series candidate having the closest correspondence to the utterance responsive to said correspondence signals.

11. A method for recognizing continuous speech according to claim 10 further characterized in that
said word position reference word combining step comprises
generating a signal representative of the similarity between each reference word series partial candidate and the utterance portion corresponding thereto responsive to said word position interval similarity signals;
and said reference word series candidate identifying step comprises combining the similarity and correspondence signals for each reference word series candidate;
and determining the reference word series candidate most closely corresponding to the utterance responsive to the combined similarity and correspondence signals for the reference word series candidate.

12. A method for recognizing continuous speech according to claim 11 further characterized in that
said utterance segment determining step comprises
for each reference word series partial candidate of the preceding word position interval generating a set of utterance segment beginning points for each reference word of the current word position interval;
said word position interval similarity forming step comprises selecting the utterance segment for said reference word jointly responsive to the set of utterance beginning points, the utterance feature signals and said reference word feature signals; and
generating a signal representative of the distance between the feature signals of the reference word and the feature signals of the selected utterance segment for said reference word.

13. A method for recognizing continuous speech according to claim 12 further characterized in that
the word position reference word selecting step comprises identifying the reference word with the minimum distance signal below a first preassigned threshold and the reference words with distance signals within a preassigned distance of the minimum distance signal reference word responsive to the reference word distance signals for each reference word series partial candidate.

14. A method for recognizing continuous speech according to claim 8, 9, 10, 11, 12, or 13 further characterized in that said signals representative of the acoustic features of a set of reference words are representative of the acoustic features of a set of reference words spoken in isolation.

15. Apparatus for recognizing an utterance as a series of predetermined reference words comprising:

means for storing a set of signals each representative of the acoustic features of a predetermined reference word;

means responsive to the utterance for generating a sequence of signals representative of the acoustic features of the utterance;

means jointly responsive to the utterance acoustic feature signals and reference word feature signals for producing a set of reference word series candidates for the utterance;

and means responsive to the reference word series candidates for identifying the utterance;

said reference word series candidate producing means includes means for generating a signal for identifying successive word positions for the utterance;

means operative in each identified word position for generating reference word series partial candidates for said word position comprising means operative for each reference word series partial candidate of the preceding word position responsive to the set of reference word feature signals and the utterance feature signals for determining an utterance segment best corresponding to the feature signals of each reference word and beginning within a predetermined range of the utterance portion endpoint of the preceding word position reference word series partial candidate, said range overlapping the preceding word position partial candidate utterance portion;

means for selecting reference words having a prescribed similarity to their corresponding utterance segments and means for combining said selected reference words with the reference word series partial candidates of the preceding word position to form reference word series partial candidates for said word position.

16. Apparatus for recognizing an utterance as a series of predetermined reference words according to claim 15 wherein said utterance identifying means comprises means for detecting the word position in which all reference word series partial candidate utterance segment endpoints are within a predetermined range of the utterance endpoint;

means responsive to the operation of said detecting means for generating a signal representative of the feature signals of each reference word series partial candidate of the detected word position;

means jointly responsive to the detected word position reference word series partial candidate feature signals and the utterance feature signals for generating a correspondence signal for each detected word position reference word series partial candidate; and means responsive to the reference word series candidate correspondence signals for selecting the reference word series candidate most closely corresponding to the utterance.

17. Apparatus for recognizing an utterance as a series of predetermined reference words according to claim 16 wherein said utterance identifying means further comprises means operative in each word position for generating a signal representative of the similarity of each word position reference word series candidate to the utterance portion corresponding thereto;

and said reference word series candidate selecting means comprises means jointly responsive to the detected word position reference word series partial candidate similarity signals and the correspondence signals for the detected word position reference word series partial candidates for selecting the reference word series candidate most closely corresponding to the utterance.

18. Apparatus for recognizing an utterance as a series of predetermined reference words according to claim 17 wherein:

said utterance segment determining means comprises means responsive to the endpoint of each preceding word position reference word series partial candidate utterance segment for generating a precessing sequence of beginning points for the utterance segment, and means jointly responsive to the set of reference word feature signals and the feature signals of the utterance from each of said beginning points for forming an utterance segment corresponding to the feature signals of each reference word.

19. Apparatus for recognizing an utterance as a series of predetermined reference words according to claim 18 wherein:

said reference word selecting means comprises means responsive to the feature signals of each reference word and the feature signals of each utterance segment formed for said reference word for generating a signal representative of the vector distance between the reference word and formed utterance segment feature signals; and means for selecting the reference word and utterance segment corresponding thereto having the minimum distance signal and reference words and utterance segments corresponding thereto having distance signals within a preassigned distance of said minimum reference word distance signals to combine with the preceding word position partial candidate series.

20. Apparatus for recognizing an utterance as a series of predetermined reference words according to claims 15, 16, 17, 18 or 19 wherein each signal representative of the acoustic features of a reference word is representative of the acoustic features of a reference word spoken in isolation.

21. A method for recognizing an utterance as a series of predetermined reference words comprising the steps of storing signals representative of the acoustic features of a set of predetermined reference words;

generating a sequence of signals representative of the acoustic features of the utterance;

producing at least one series of reference words as a candidate for the utterance responsive to the reference word feature signals and the utterance acoustic feature signals;

and identifying the utterance as one of said reference word series candidates;

wherein the reference word series candidate generating step comprises identifying successive word positions for the utterance;

in each identified word position, generating reference word series partial candidate including determining, for each reference word series partial candidate of the preceding word position and each reference word, an utterance segment in the current word position overlapping the utterance segment of the preceding word position reference word series partial candidate that best corresponds to the reference word acoustic feature signals; and combining reference words having a prescribed similarity to their corresponding utterance segments with the partial reference word series candidates of the preceding word position to form reference word series partial candidates for the current word position.

22. A method for recognizing an utterance as a series of predetermined reference words according to claim 21 wherein:

said utterance identifying step comprises detecting the final word position in which the utterance segments of all reference word series partial candidates are within a predetermined range of the utterance termination;

responsive to the detection of the final word position, generating a set of feature signals corresponding to each reference word series partial candidate of the final word position;

generating a signal for each final word position reference word series partial candidate representative of the correspondence of the final word position reference word series partial candidate to the utterance from the reference word series candidate feature signals and the utterance acoustic feature signals;

and selecting the reference word series candidate most closely corresponding to the utterance responsive to the final word position reference word series partial candidate correspondence signals.

23. A method for recognizing an utterance as a series of reference words according to claim 22 wherein:

said utterance identifying step further comprises producing a signal representative of the similarity between each reference word series partial candidate feature signals and the acoustic feature signals of the utterance portion corresponding thereto in each word position;

and wherein said reference word series candidate selecting step comprises combining the final word position reference word series partial candidate similarity signal with the final word position reference word series partial candidate correspondence signal;

and responsive to the combined similarity and correspondence signals of the final word position reference word series partial candidates, identifying the reference word series candidate most similar to the utterance.

24. A method for recognizing an utterance as a series of predetermined reference words according to claim 23 wherein said reference word corresponding utterance segment determining step comprises:

generating a set of utterance segment beginning points overlapping the utterance segment of the preceding word position reference word series partial candidate;

and selecting the utterance segment having feature signals most similar to the feature signals of the reference word.

25. A method for recognizing an utterance as a series of predetermined reference words according to claims 21, 22, 23 or 24 wherein the signals representative of the acoustic features of the set of predetermined reference words are representative of the acoustic features of the set of predetermined reference words spoken in isolation.

* * * * *